United States Patent [19]

Kinoshita et al.

[11] Patent Number: 5,726,709
[45] Date of Patent: Mar. 10, 1998

[54] IMAGING APPARATUS INCLUDING OFFSET PIXELS FOR GENERATING VERTICAL HIGH FREQUENCY COMPONENT

[75] Inventors: Kosuke Kinoshita; Takashi Shinozaki, both of Yokohama; Takuya Tsushima, Kamakura; Masaji Yoshida, Fujisawa; Hiroyuki Kitamura, Hiratsuka; Tetsuya Suwa, Yokohama, all of Japan

[73] Assignee: Victor Company of Japan, Ltd., Japan

[21] Appl. No.: 773,930

[22] Filed: Dec. 30, 1996

Related U.S. Application Data

[62] Division of Ser. No. 452,816, May 30, 1995, Pat. No. 5,640,206.

[30] Foreign Application Priority Data

May 31, 1994 [JP] Japan .................... 6-141181
Sep. 27, 1994 [JP] Japan .................... 6-257583

[51] Int. Cl.$^6$ .................... H04N 9/09; H04N 9/097
[52] U.S. Cl. .................... 348/264; 348/265; 348/338
[58] Field of Search .................... 348/222, 262, 348/263, 264, 265, 336, 337, 338; 358/50, 52; H04N 9/09, 9/097, 9/093

[56] References Cited

U.S. PATENT DOCUMENTS

| | | | |
|---|---|---|---|
| 5,289,269 | 2/1994 | Sugimori | 348/265 |
| 5,414,465 | 5/1995 | Kodama | 348/264 |
| 5,436,661 | 7/1995 | Yamamoto | 348/265 |

FOREIGN PATENT DOCUMENTS 4200195 7/1992 Japan.
626910 9/1994 Japan.

*Primary Examiner*—Sherrie Hsia
*Attorney, Agent, or Firm*—Rossi & Associates

[57] ABSTRACT

An imaging apparatus comprises: a color separation optical system for separating an image ray into blue, green, and red image rays, image sensors, having pixels vertically and horizontally arranged, for receiving the image rays and producing blue, red, and green signals wherein at least one of image sensors for blue and red signals has a vertical relative offset against the image sensor for green signal to have a relative interlace relation with the image sensor for blue or red color signal, to produce a screen to be produced, having a higher resolution than these image sensors. A vertical high frequency component is operated from the blue and red signals and is added to the green color signal to produce a second green signal indicative of a green luminance value at a position corresponding to each pixel of the image sensors for blue and red color signals to increase the vertical resolution of the screen. A fourth image sensor for green and a separation optical system for the fourth image sensor may be provided to increase a horizontal resolution by arranging the fourth image sensor to have a horizontal offset to have a second relative interlace relation with the image sensor for green. The image sensor for blue and red may have a vertical offset to eliminate the necessity of a field memory to operate the vertical high frequency component.

8 Claims, 26 Drawing Sheets

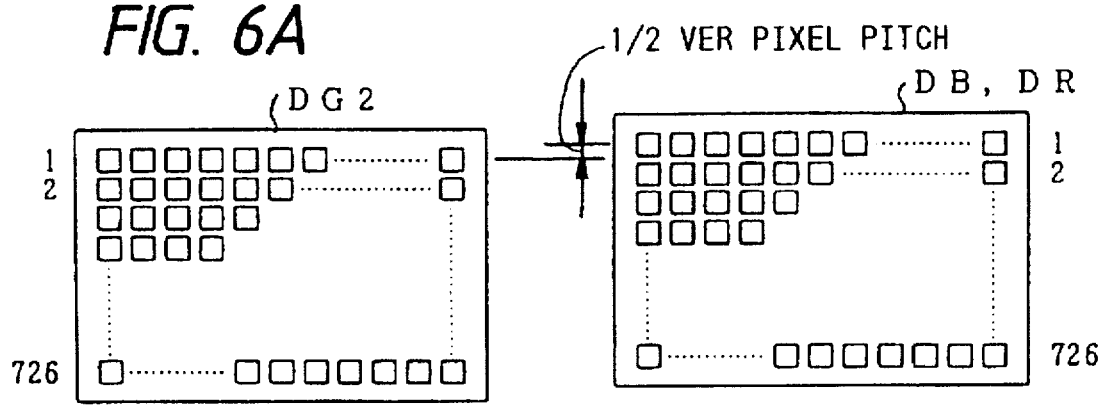
FIG. 6A
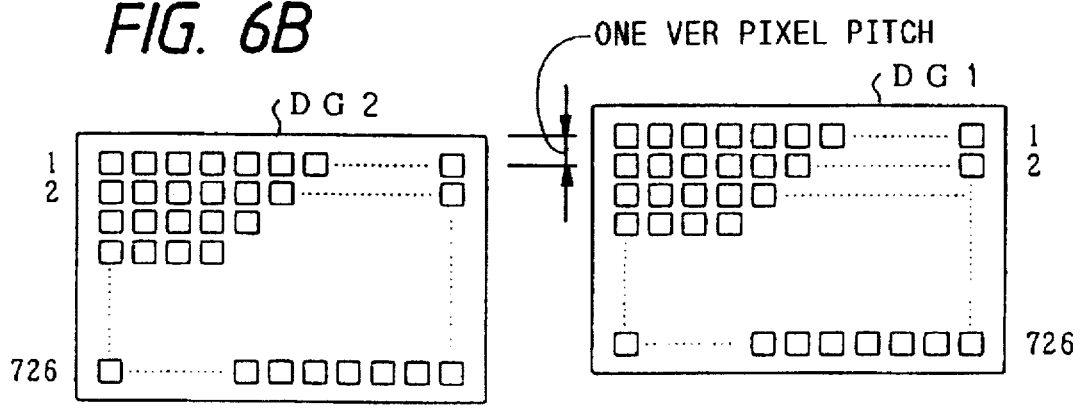
FIG. 6B
FIG. 6C
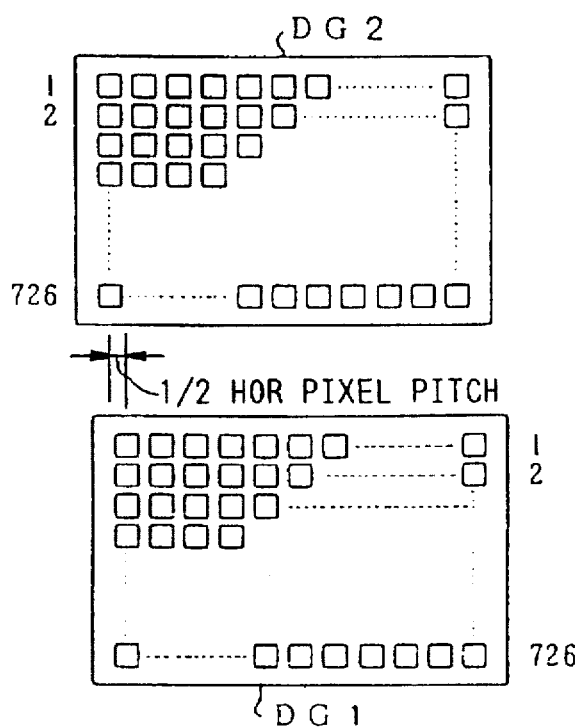

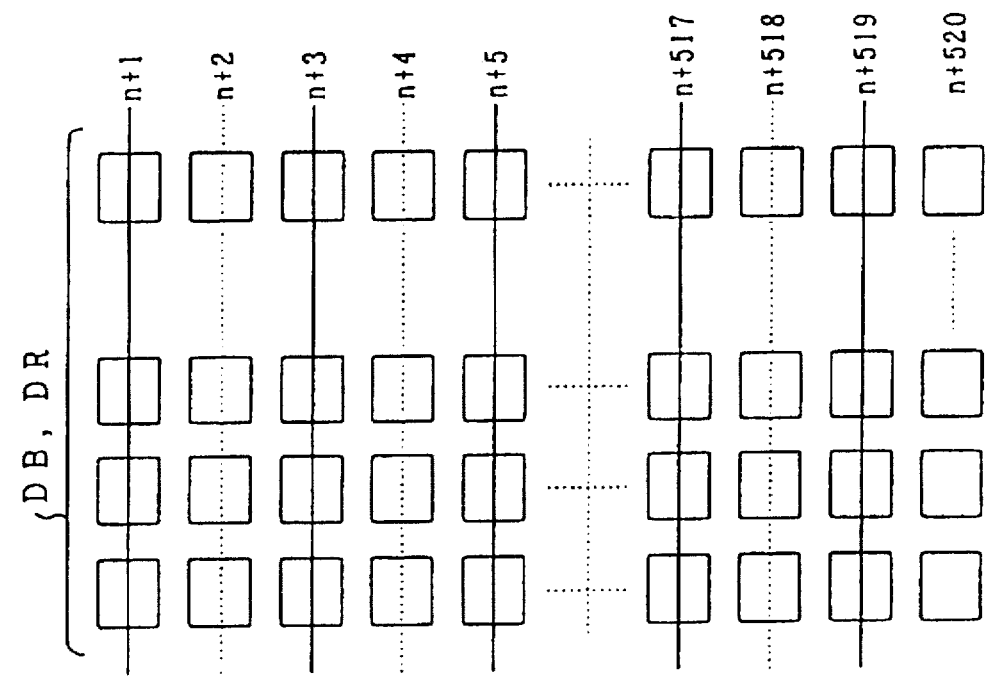
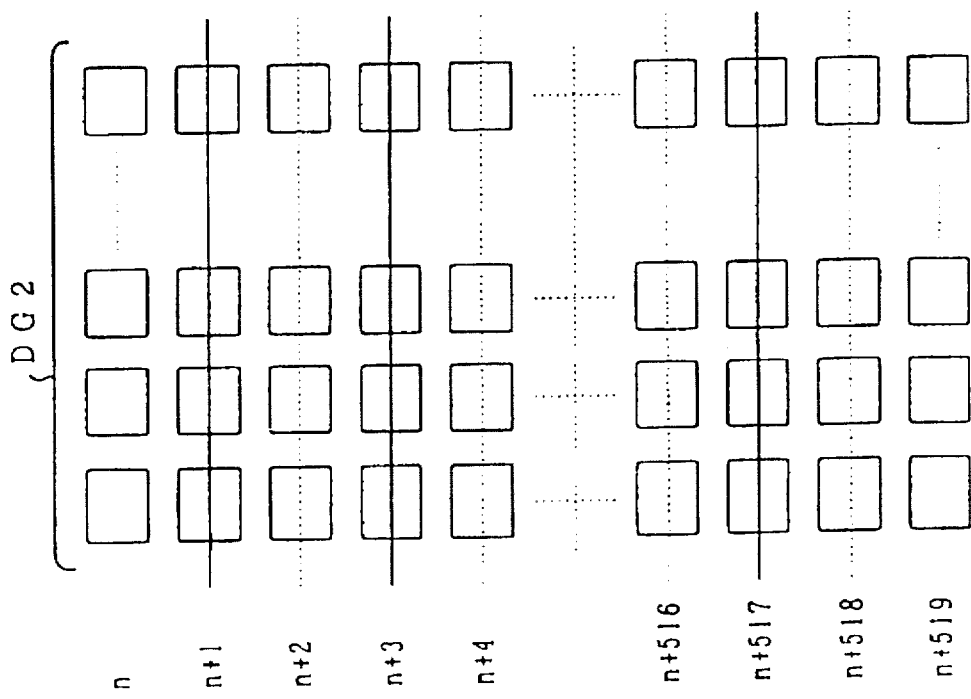
FIG. 7

FIG. 9
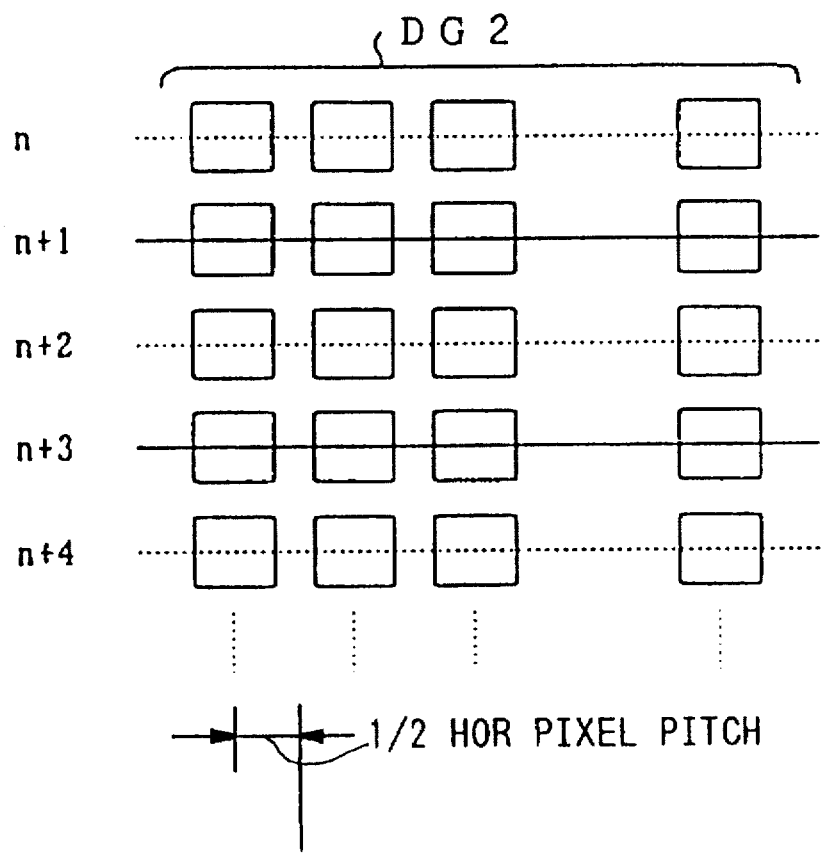
1/2 HOR PIXEL PITCH
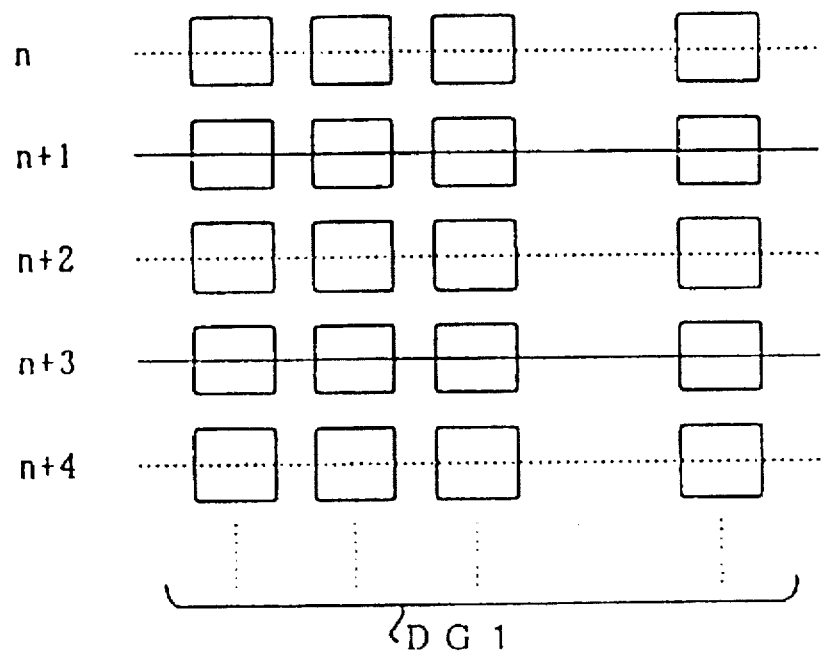

FIG. 14

| G2m-1,n-2 | g1m-1,n-1 | G2m-1,n-1 | g1m-1,n | G2m-1,n | g1m-1,n+1 | G2m-1,n+1 | | G2m+1,n-2 | g1m+1,n-1 | G2m+1,n-1 | | G2m+1,n | | G2m+1,n | | G2m+1,n+1 | |
|---|---|---|---|---|---|---|---|---|---|---|---|---|---|---|---|---|---|
| r m-1,n-1<br>b m-1,n-1 | | r m,n-1<br>b m,n-1 | | r m,n-1<br>b m,n-1 | | r m,n+1<br>b m,n+1 | | r m+1,n-1<br>b m+1,n-1 | | r m,n-1<br>b m,n-1 | | r m,n<br>b m,n | | r m,n<br>b m,n | | r m+1,n+1<br>b m+1,n+1 | |
| g2m-1,n-1 | G1m-1,n-1 | g2m,n-1 | G1m,n-1 | g2m,n | G1m,n | g2m,n+1 | | g2m+1,n-1 | G1m+1,n-1 | g2m+1,n | | g2m+1,n | | g2m+1,n+1 | | |
| R m-1,n-1<br>B m-1,n-1 | | R m,n-1<br>B m,n-1 | | R m,n<br>B m,n | | R m,n+1<br>B m,n+1 | | R m+1,n-1<br>B m+1,n-1 | | R m+1,n<br>B m+1,n | | R m+1,n<br>B m+1,n | | R m+1,n+1<br>B m+1,n+1 | | |
| G2m-1,n-1 | g1m-1,n | G2m,n-1 | g1m,n | G2m,n | g1m,n+1 | G2m,n+1 | | G2m+1,n-1 | g1m+1,n | G2m+1,n | | G2m+1,n | | G2m+1,n+1 | | |

FIG. 15

| $G2_{m-1,n-2}$ | $VH1_{m-1,n-1}$ | $g2_{m-1,n-1}$ | $VH2_{m-1,n-1}$ | $G2_{m-1,n-1}$ | $VH1_{m-1,n}$ | $g2_{m-1,n}$ | $VH2_{m-1,n}$ | $G2_{m-1,n}$ | $VH1_{m-1,n+1}$ | $g2_{m-1,n+1}$ | $VH2_{m-1,n+1}$ |
|---|---|---|---|---|---|---|---|---|---|---|---|
| $g1_{m-1,n-1}$ |  | $G1_{m-1,n-1}$ |  | $g1_{m-1,n}$ |  | $G1_{m-1,n}$ |  | $g1_{m-1,n+1}$ |  | $G1_{m-1,n+1}$ |  |
| $G2_{m,n-2}$ | $VH1_{m,n-1}$ | $g2_{m,n-1}$ | $VH2_{m,n-1}$ | $G2_{m,n-1}$ | $VH1_{m,n}$ | $g2_{m,n}$ | $VH2_{m,n}$ | $G2_{m,n}$ | $VH1_{m,n+1}$ | $g2_{m,n+1}$ | $VH2_{m,n+1}$ |
| $g1_{m,n-1}$ |  | $G1_{m,n-1}$ |  | $g1_{m,n}$ |  | $G1_{m,n}$ |  | $g1_{m,n+1}$ |  | $G1_{m,n+1}$ |  |
| $G2_{m+1,n-2}$ | $VH1_{m+1,n-1}$ | $g2_{m+1,n-1}$ | $VH2_{m+1,n-1}$ | $G2_{m+1,n-1}$ | $VH1_{m+1,n}$ | $g2_{m+1,n}$ | $VH2_{m+1,n}$ | $G2_{m+1,n}$ | $VH1_{m+1,n+1}$ | $g2_{m+1,n+1}$ | $VH2_{m+1,n+1}$ |

FIG. 16

| G 2 m-1, n-2 | g 2 m-1, n-1 | G 2*m-1, n-1 | G 2 m-1, n-1 | | g 2 m-1, n | G 2*m-1, n | G 2 m-1, n | | g 2 m-1, n+1 | G 2*m-1, n+1 |
|---|---|---|---|---|---|---|---|---|---|---|
| | g 1 m-1, n-1 | G 1*m-1, n-1 | G 1 m-1, n-1 | | g 1 m-1, n | G 1 m-1, n | | | g 1 m-1, n+1 | G 1*m-1, n+1 | G 1 m-1, n+1 |
| | G 2 m, n-2 | g 2 m, n-1 | G 2*m, n-1 | G 2 m, n-1 | | g 2 m, n | G 2*m, n | G 2 m, n | | g 2 m, n+1 | G 2*m, n+1 |
| | | g 1 m, n-1 | G 1*m, n-1 | G 1 m, n-1 | | g 1 m, n | G 1*m, n | G 1 m, n | | g 1*m, n+1 | G 1 m, n+1 |
| | G 2 m+1, n-2 | | g 2 m+1, n-1 | G 2*m+1, n-1 | G 2 m+1, n-1 | | g 2 m+1, n | G 2*m+1, n | G 2 m+1, n | | g 2 m+1, n+1 | G 2*m+1, n+1 |

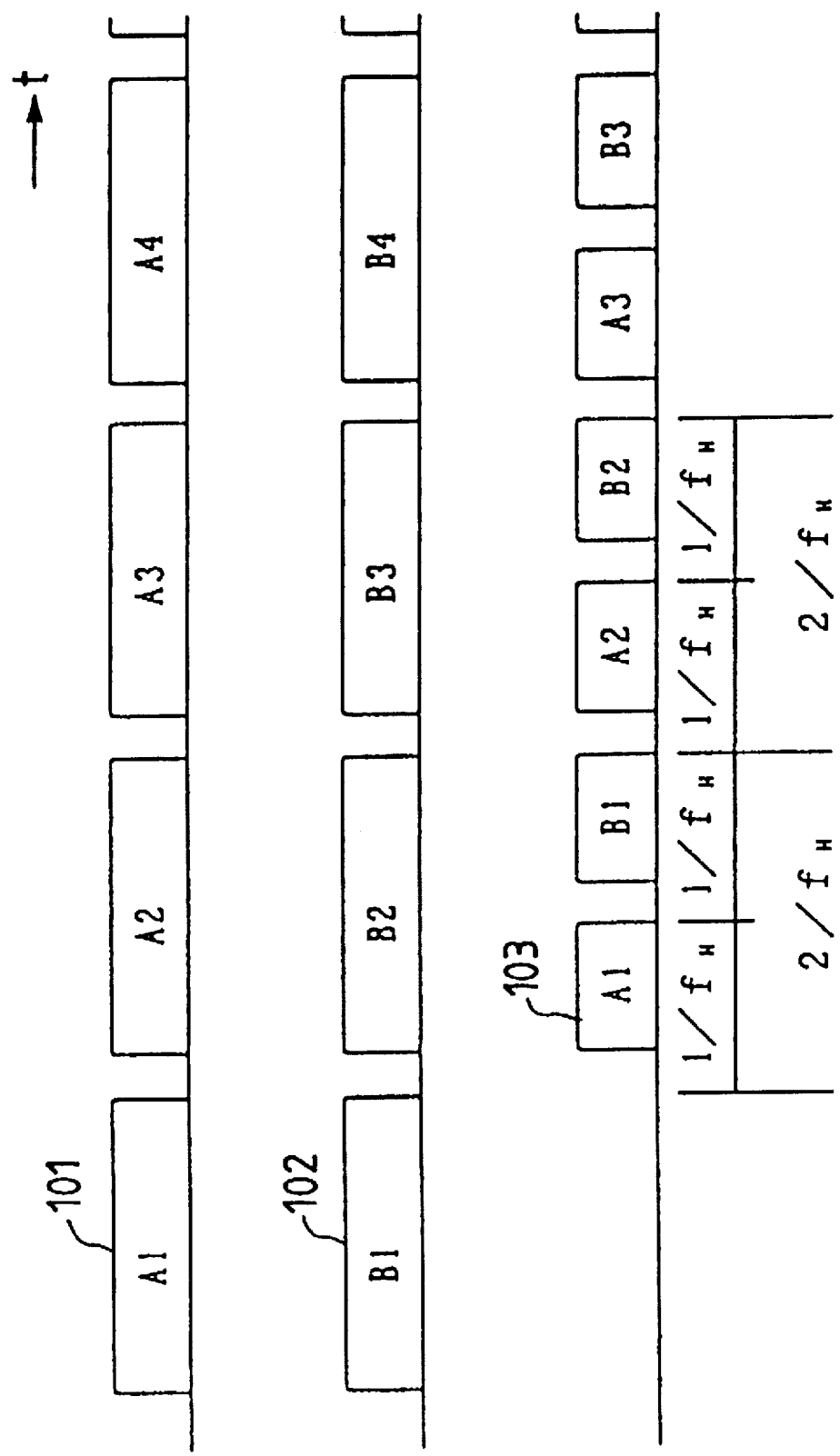

FIG. 27

| G 2m-1,n-2 | g 1m-1,n-1 | G 2m,n-2 | g 1m,n-1 | G 2m+1,n-2 |
| R m-1,n-2<br>b m-1,n-1 | | R m,n-2<br>b m,n-1 | | R m+1,n-2<br>b m+1,n-1 |
| g 2m-1,n-1 | G 1m-1,n-1 | g 2m,n-1 | G 1m,n-1 | g 2m+1,n-1 |
| r m-1,n-1<br>B m-1,n-1 | | r m,n-1<br>B m,n-1 | | r m+1,n-1<br>B m+1,n-1 |
| G 2m-1,n-1 | g 1m-1,n | G 2m,n-1 | g 1m,n | G 2m+1,n-1 |
| R m-1,n-1<br>b m-1,n | | R m,n-1<br>b m,n | | R m+1,n-1<br>b m+1,n |
| g 2m-1,n | G 1m-1,n | g 2m,n | G 1m,n | g 2m+1,n |
| r m-1,n<br>B m-1,n | | r m,n<br>B m,n | | r m+1,n<br>B m+1,n |
| G 2m-1,n | g 1m-1,n+1 | G 2m,n | g 1m,n+1 | G 2m+1,n |
| R m-1,n<br>b m-1,n+1 | | R m,n<br>b m,n+1 | | R m+1,n<br>b m+1,n+1 |
| g 2m-1,n+1 | G 1m-1,n+1 | g 2m,n+1 | G 1m,n+1 | g 2m+1,n+1 |
| r m-1,n+1<br>B m-1,n+1 | | r m,n+1<br>B m,n+1 | | r m+1,n+1<br>B m+1,n+1 |

FIG. 28
PRIOR ART
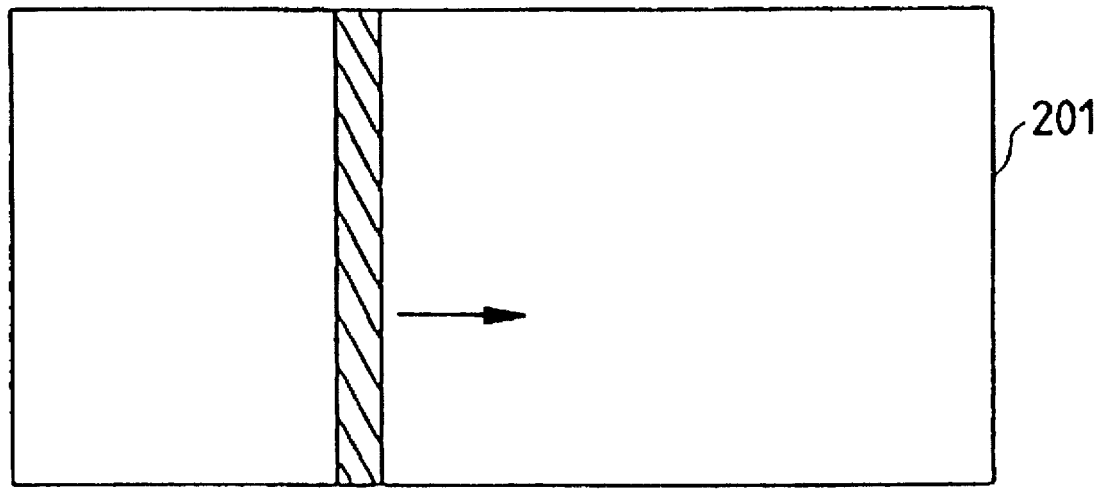
PREVIOUS FIELD
201
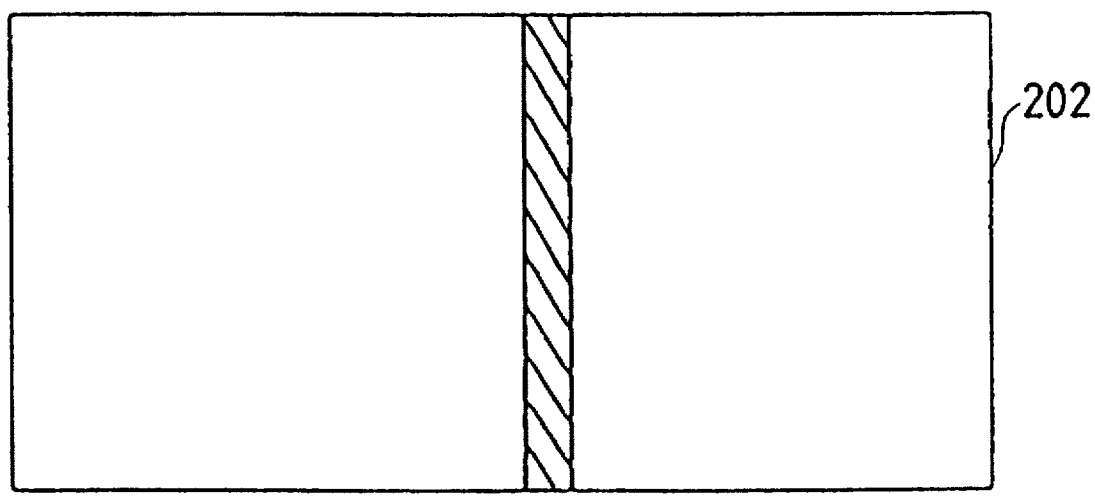
CURRENT FIELD
202

IMAGING APPARATUS INCLUDING OFFSET PIXELS FOR GENERATING VERTICAL HIGH FREQUENCY COMPONENT

This is a Division of application Ser. No. 08/452,816, filed May. 30, 1995, U.S. Pat. No. 5,640,206.

BACKGROUND OF THE INVENTION

1. Field of the Invention

This invention relates to an imaging apparatus for producing color image signals.

2. Description of the Prior Art

An imaging apparatus for producing color image signals having a high resolution, such as a high definition TV signal, using image sensors having general resolutions after modification of the image sensors is known. Japanese patent application provisional publication No. 5-78730 discloses an imaging apparatus comprising a color separation optical system for color-separating an input image into red, green, and blue images, red, green, and blue image sensors for receiving the red, green, and blue images and generating red, green, and blue image signals, wherein the green image is divided into two images which are received by two PAL system image sensors. The PAL system image sensors are arranged such that pixels of these sensors for green are masked and shifted in the vertical direction, so that resultant pixel positions of these image sensors are shifted by a half pitch of the pixel pitch of these image sensors. Therefore, a resultant resolution is twice the resolution of each PAL system image sensors.

SUMMARY OF THE INVENTION

The aim of the present invention is to provide an improved imaging apparatus.

According to this invention, there is provided a first imaging apparatus for outputting blue, red, and green color signals in response to an image ray, comprising: a color separation optical system for separating the image ray into blue, green, and red image rays; a first image sensor, having first pixels vertically and horizontally arranged, for receiving the blue image ray and producing the blue color signal; a second image sensor, having second pixels vertically and horizontally arranged, for receiving the red image ray and producing the red color signal; and a third image sensor, having third pixels vertically and horizontally arranged, for receiving the green image ray and producing the green color signal, at least one of the first and second pixels respectively having vertical relative offsets against the third pixels to have a relative interlace relation with the third pixels to produce a screen to be produced from the blue, red, and green color signals, the screen having a higher resolution than the first to third image sensors.

The first imaging apparatus further comprises: a vertical component extracting circuit for extracting a vertical high frequency component from the color signal from the image sensor having the pixels having the vertical relative offsets, the vertical high frequency component corresponding a green color luminance value at a corresponding position of the pixels having the vertical relative offset; an adding circuit for adding the vertical high frequency component to the green color signal to produce a second green color signal indicative of the green color luminance value; a first field generation portion for outputting the blue and red color signals and the second green color signal as the green color signal to form a first field of the screen; and a second field generation portion for outputting the second blue and red color signals and the first green color signal to form a second field of the screen.

A fourth image sensor for green and a separation optical system for the fourth image sensor may be provided to increase a horizontal resolution by arranging the fourth image sensor to have a horizontal offset to have a second interlace relation with the image sensor for green.

According to this invention, there is provided a second imaging apparatus for outputting blue, red, and first and second green color signals in response to an image ray, comprising: a first color separation optical system for separating the image ray into blue, red and green image rays; a second separation optical system for separating the green image ray into first and second green image rays; a first image sensor, having first pixels vertically and horizontally arranged, for receiving the blue image ray and producing a blue color signal; a second image sensor, having second pixels vertically and horizontally arranged, for receiving the red image ray and producing a red color signal; a third image sensor, having third pixels vertically and horizontally arranged, for receiving the first green image ray and producing a first green color signal; and a fourth image sensor, having fourth pixels vertically and horizontally arranged, for receiving the second green image ray and producing a second green color signal, at least one of the first and second pixels respectively having vertical relative offsets against the third pixels to have a first relative interlace relation with the third pixels to produce a screen to be produced from the blue, red, and green color signals, the screen having a higher resolution than the first to fourth image sensors, the screen having a higher horizontal resolution than the first to fourth image sensors by arranging the third pixels having a horizontal relative offset against the fourth pixels to have a second relative interlace relation between the third and fourth pixels. A fourth image sensor for green and a separation optical system for the fourth image sensor may be provided to the third imaging apparatus to increase a horizontal resolution by arranging the fourth image sensor to have a horizontal offset to have a second interlace relation with the image sensor for green.

Each of these imaging apparatus further comprises a reading control portion for controlling producing the blue, red and green color signals in an interlace manner. Therefore, the vertical high frequency component is obtained using a field memory to obtain a framed color signal for providing the vertical high frequency component. In these imaging apparatus, the first and second image sensors may have a vertical offset to provide different fields of blue and red color signals to provided the vertical high frequency component without the field memory because the framed color signal is provided by only adding the blue and red color signals.

BRIEF DESCRIPTION OF THE DRAWINGS

The object and features of the present invention will become more readily apparent from the following detailed description taken in conjunction with the accompanying drawings in which:

FIGS. 6A to 6C are illustrations of first and second embodiments showing image sensors having positional offsets each other;

FIG. 7 is an illustration of the first and second embodiments partially showing image sensors having a positional offset shown in FIGS. 6A to 6C;

FIG. 9 is an illustration of this invention partially showing image sensors having a horizontal positional offset;

FIG. 14 is an illustration of this invention showing pixels numbered on the Hi-Vision screen;

FIG. 15 is an illustration of this invention showing the vertical high frequency components;

FIG. 16 is an illustration of this invention showing pixels represented by the signal G1* and G2* to which vertical high frequency components are added;

FIG. 17 is a diagram of this invention showing signals outputted by the line memories;

FIG. 27 is an illustration of the third embodiment showing a map of pixels numbered; and FIG. 28 is an illustration of example images of a prior art on a screen.

The same or corresponding elements or parts are designated with like references throughout the drawings.

DETAILED DESCRIPTION OF THE INVENTION

Figure 1:
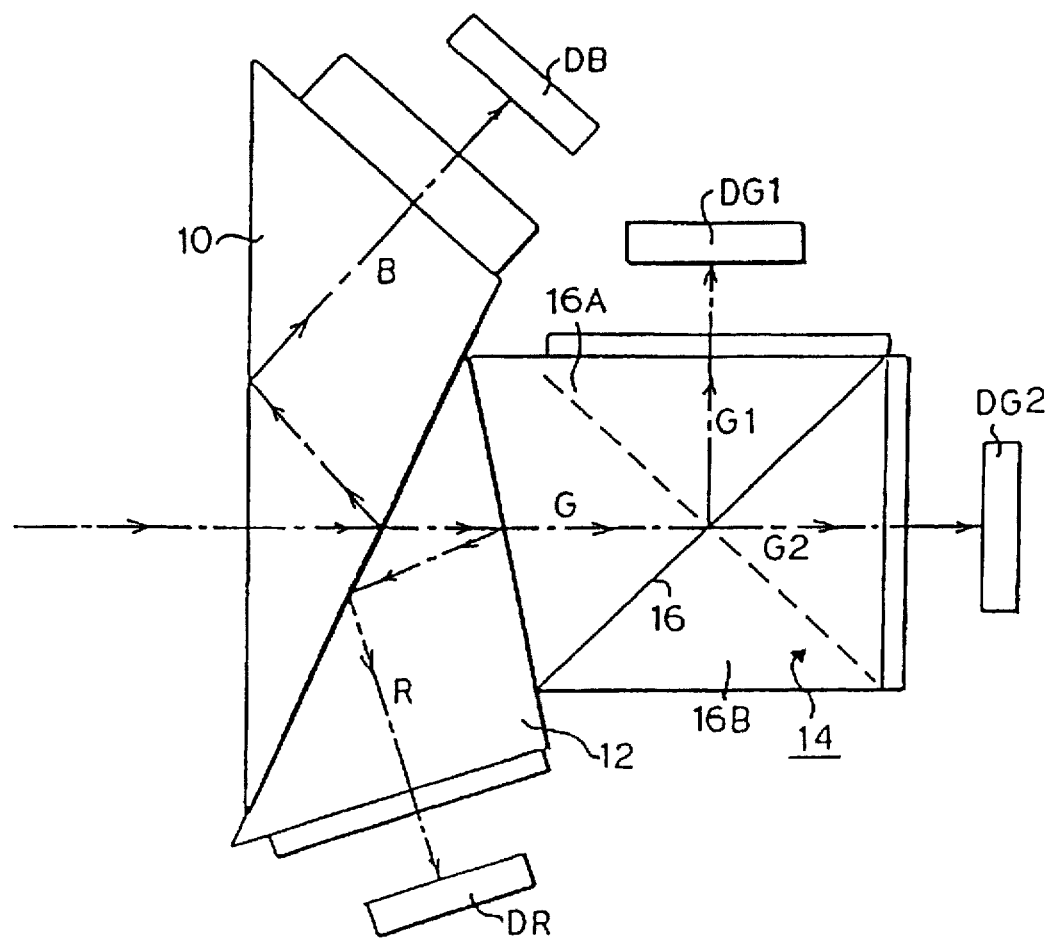
FIG. 1 is a cross-sectional view of this invention showing a color separation optical system.

Hereinbelow will be described a first embodiment of this invention. FIG. 1 is a cross-sectional view of this invention showing a color separation optical system.

The color separation optical system comprises a blue prism 10 for separating a blue color image ray and a red-green image ray from an input image ray, a red prism 12 for separating a red color image ray and a green color image from the red-green color image ray, and a green prism 14 for obtaining first and second green image rays. Between the blue prism 10 and the red prism 12, an air layer (not shown) having a small thickness is provided. This structure mentioned above is similar to the general color separation optical system for three imagers. The difference is in that the green prism 14 has a half mirror 16 for separating the green image ray from the red prism 12 into the first and second image rays. That is, the green prism 14 has a first green prism 16A and a second green prism 16B and a half mirror on a junction plane of the first and second green prisms 16A and 16B. More specifically, the half mirror 16 is arranged diagonally, that is, at 45° to reflects a half of the green image ray and transmits the remaining green image ray. Image sensors for blue color, red color, a first green color and a second green color, namely, the (blue) image sensor DB, the (red) image sensor DR, the (first green) image sensor DG1, and the (second green) image sensor DG2 are arranged at focus points respectively. Since the half mirror 16 is arranged at 45°, image planes of the image sensors DG1 and DG2 have a right angle. Therefore, it is easy to manufacture the first and second green prisms 16A and 16B and it is possible to mount the image sensors DG1 and DG2 for green.

Figure 2A:
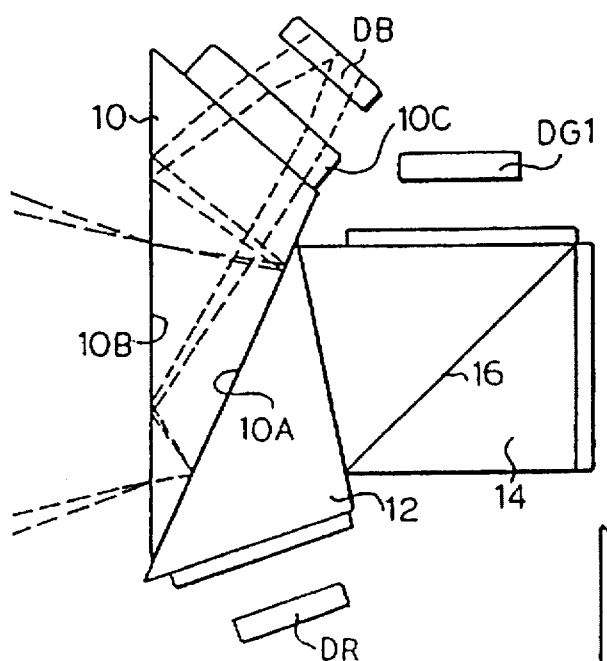
FIGS. 2A to 2C are cross-sectional view of this invention illustrating an operation of the color separating optical system in FIG. 1.
Figure 2B:
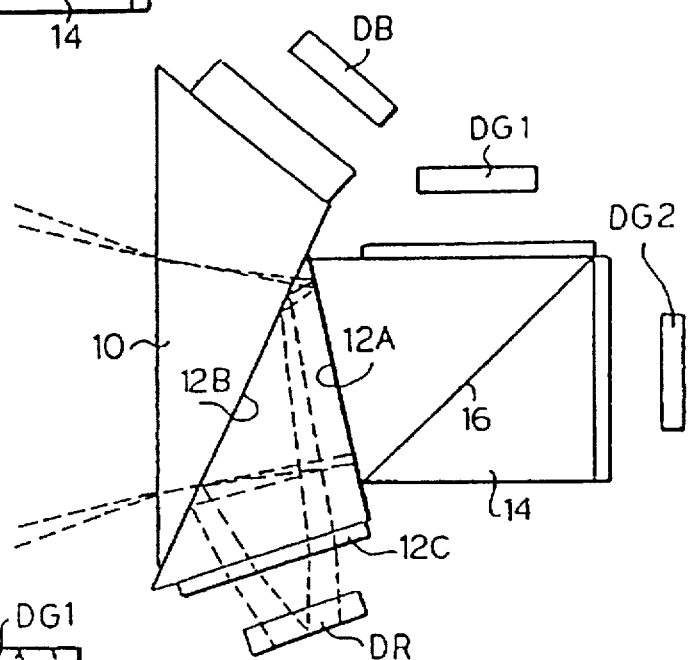
Figure 2C:
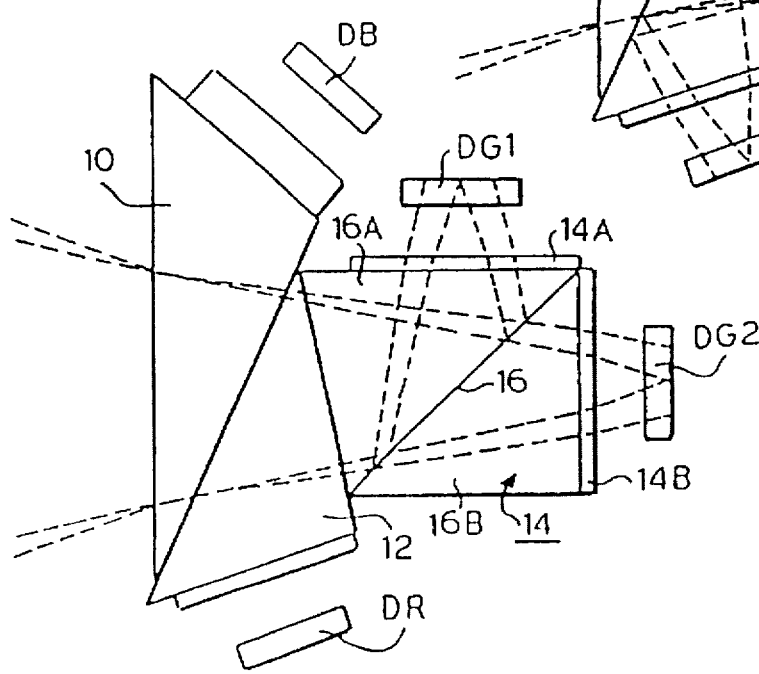

FIGS. 2A to 2C are cross-sectional view of this invention illustrating an operation of the color separating optical system in, FIG. 1. Incident light from an objective lens system, not shown, is separated into a blue image ray and a remaining red-green ray by a dichroic film 10A of the blue prism as shown in FIG. 2A. That is, the dichroic film 10A selectively reflects the blue image ray toward an incident plane 10B of the blue prism 10. The incident plane 10B totally reflects the blue image ray toward the image sensor DB for blue, namely, a blue image sensor DB through a blue trimming filter 10C. The blue image ray is focused on the blue image sensor DB with a blue image formed.

The remaining red-green ray transmits the dichroic film 10A and enters the red prism 12. The remaining red-green ray is separated into a red image ray and a remaining green ray by a dichroic film 12A of the red prism 12 as shown in FIG. 2B. That is, the dichroic film 12A selectively reflects the red image ray toward an incident plane 12B of the red prism 12, wherein the air film is formed. The incident plane 12B totally reflects the red image ray toward the image sensor DR for red, namely, a red image sensor DB through a red trimming filter. The red image ray is focused on the red image sensor DR with a red image formed.

The remaining green ray transmits the dichroic film 12A and enters the green prism 14. The above-mentioned operation is common to the operation of the conventional color separation optical system. The remaining green ray is separated into a first green image ray and a second green ray by the half mirror 16 as shown in FIG. 2C. That is, the half mirror 16 partially reflects the green ray toward the first green image sensor DG1 and focused as a first green image ray on the first green image sensor DG1 with a first green image formed. The half mirror 16 partially transmits the remaining green ray, i.e., a second green image ray, toward the second image sensor for green, that is, the first green image sensor DG2. The second green image ray is focused on the second green image sensor DG2 with a second green image formed.

As mentioned, the color separation optical system of this embodiment is similar to the conventional color separation optical system with respect to forming the blue and red images. However, the green image is divided into two green images on the first and second green image sensors DG1 and DG2. Therefore, this imaging apparatus has a four image sensor structure.

Since the first green image on the first green image sensor DG1 is formed through reflection by the half mirror 16, the image is reversed with respect to the other image sensors. Therefore, an image signal from a CCD of the first green image sensor DG1 is read the right side left or reversed using a line memory or a frame memory to obtain a non-inverted image.

A setting of a High-Vision image area having an aspect ratio 16:9 on the image sensors will be described.

For the image sensors DB, DR, DG1, and DG2, generally available cheap CCD imaging devices of PAL system having ⅓ inch of image area are used. These CCD imaging devices are for the vibration compensation use. Therefore, numbers of pixels in the horizontal and vertical direction are greater by about 25% of the non-vibration compensation use CCD imaging device.

Figure 3:
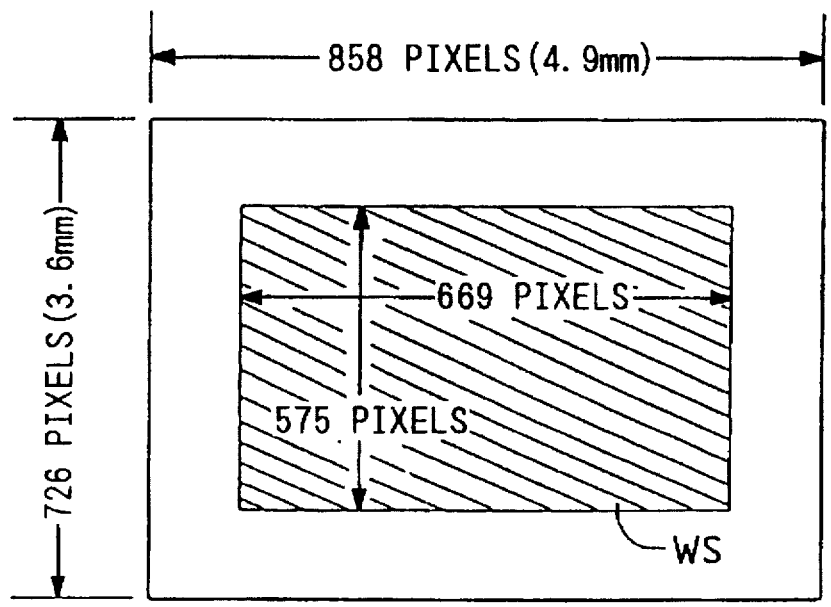
FIG. 3 is a plan view of an imaging plane of a prior art CCD image sensor.

FIG. 3 is a plan view of an imaging plane of a prior art CCD image sensor. This prior art CCD imaging device has a vertical dimension of the image area of 3.6 mm and a horizontal dimension of 4.9 mm. The number pixels of the vertical direction is 726 and the number of pixels of the horizontal direction is 858. A specific region WS of the PAL system has 575 pixels vertically and 669 horizontally. The image area of the prior art imaging device has larger vertical and horizontal dimensions than the specific region WS. Therefore, if the image formed on the imaging device fluctuates in vertically or horizontally, the image signal is read such that the image area WS is shifted in accordance with the fluctuation of the position of the image area to cancel the fluctuation.

In this embodiment, such a CCD imaging device of PAL system generally available is used for the Hi-Vision image reading because the number of pixels are larger than the CCD image sensor for non-vibration compensation use.

Then, one CCD imaging device cannot provide all 1035 lines for one frame of the Hi-Vision. Therefore, each of two CCD imaging devices provides 517.5 lines, namely, a half of lines of one frame. Then, the number of pixels in the horizontal direction is determined to be 808 because the aspect ratio is 16:9 in the Hi-Vision screen.

Figure 4:
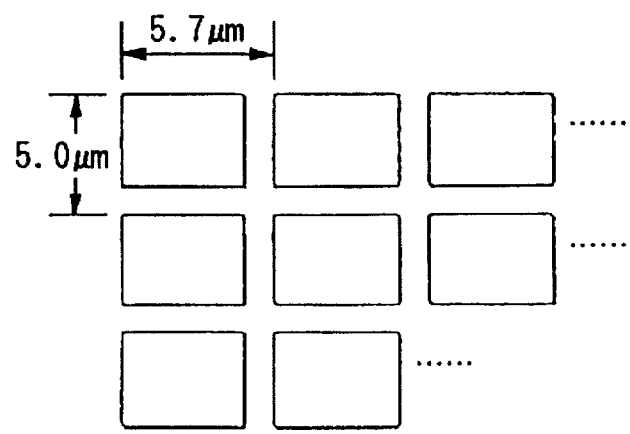
FIG. 4 is an enlarged view of this invention showing a portion of an image sensor.

More specifically, FIG. 4 is an enlarged view of this invention showing a portion of an image sensor. From the number of pixels in the vertical direction and the number of pixels in the horizontal direction, and the dimensions shown in FIG. 4. The vertical pixel pitch is 5.0 μm and tile horizontal pixel pitch is 5.7 μm. As mentioned, there are 518 pixels in the vertical direction, so that a total dimension of the image area WW is 518×5 μm=2.59 mm. Therefore, the horizontal dimension of image area WW is 2.59×(16/9)=4.9 mm wherein the number of the pixels in the horizontal direction is 4.6 mm/5.7 μm=808.

Figure 5:
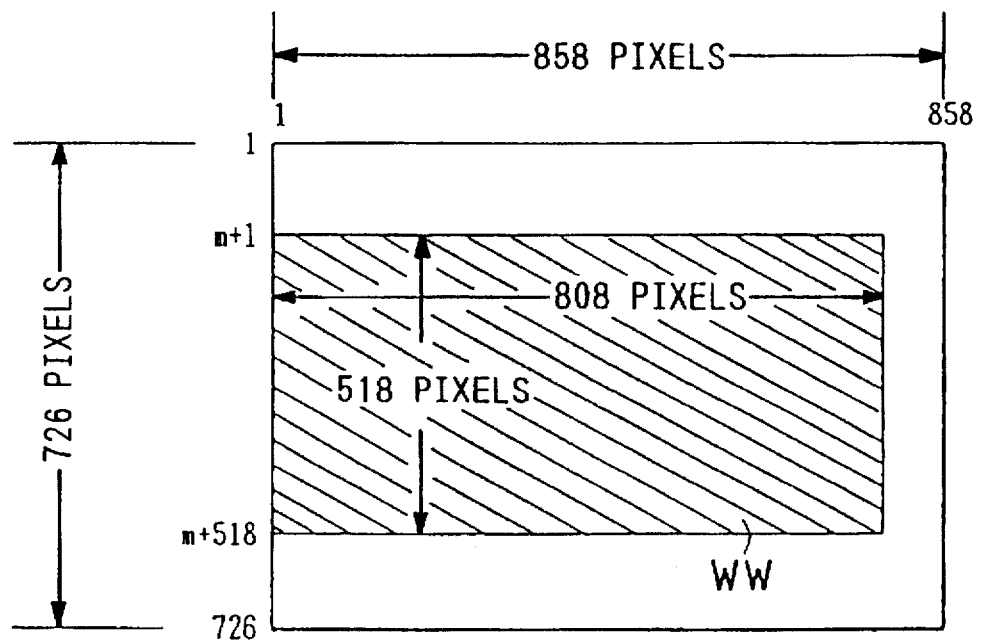
FIG. 5 is an illustration of an image area of this invention.

FIG. 5 is an illustration of an image area of this invention. An image area WW having the aspect ratio 16:9 for Hi-Vision is set at a 808×518 pixel area on the CCD image sensor having a 858×726 pixel area. The position of the image area WW is determined suitably. However, in this embodiment, the image area is determined at the middle of the CCD image sensor in the vertical direction and the left of the CCD image sensor in the horizontal direction. Therefore, in this embodiment, charges within the image area WW are read as video signals and charges at other area are thrown away. Such technique is well known.

A technique for obtaining a vertical resolution for Hi-Vision will be described. A vertical resolution in the Hi-Vision is about twice those in the NTSC and the PAL systems. However, in this invention, the image area WW set for Hi-Vision image on one CCD imaging sensor has a half of resolution of the specific horizontal resolution of Hi-Vision. Then, in this invention, positions of the blue and red image sensors DB and DR are vertically shifted from the corresponding positions of the green image sensors DG1 and DG2 by a half of a vertical pixel pitch to increase the vertical resolution. That is, the positions of each of pixels of the blue and red image sensors DB and DR are vertically shifted from the corresponding position of each of pixels of the green image sensors DG1 and DG2 by a half of a vertical pixel pitch. Then, the vertical resolution is increased by using color signals from these image sensors. As well known, the luminance signal, i.e., the Y signal determines the resolution of the image in the Hi-Vision system and the Y signal is also derived from blue and red components in addition to the green component. This relation in the Hi-Vision is given by:

$$Y=0.212R+0.701G+0.087B$$

Therefore, the vertical resolution can be increased using vertical components obtained from the blue and red components which have vertically shifted positional relations with the green component from the green image sensors DG1 and DG2.

FIGS. 6A to 6C are illustrations of first and second embodiments showing image sensors having positional offsets each other. As shown in FIG. 6A, the blue and red image sensors are arranged with a vertical shift from the corresponding position of the green image sensor DG2 by a half vertical pixel pitch, that is, there is an interlace relation in the vertical direction between the pixels of the image sensor blue and red image sensors and the green image sensor DG2. FIG. 7 is an illustration of the first and second embodiments partially showing image sensors having a positional offset shown in FIGS. 6A to 6C. References "n+m" represent ordinal numbers of the horizontal lines of image sensors DG2, DB, and DR and the image area WW in FIG. 5 for the Hi-Vision system ranges from n+1 to n+518 lines. This vertical positional offset relation between the green CCD image sensor DG2 and the blue and red image sensors DB and DR provides a vertical high frequency component for a green video signal as mentioned later.

Figure 8:
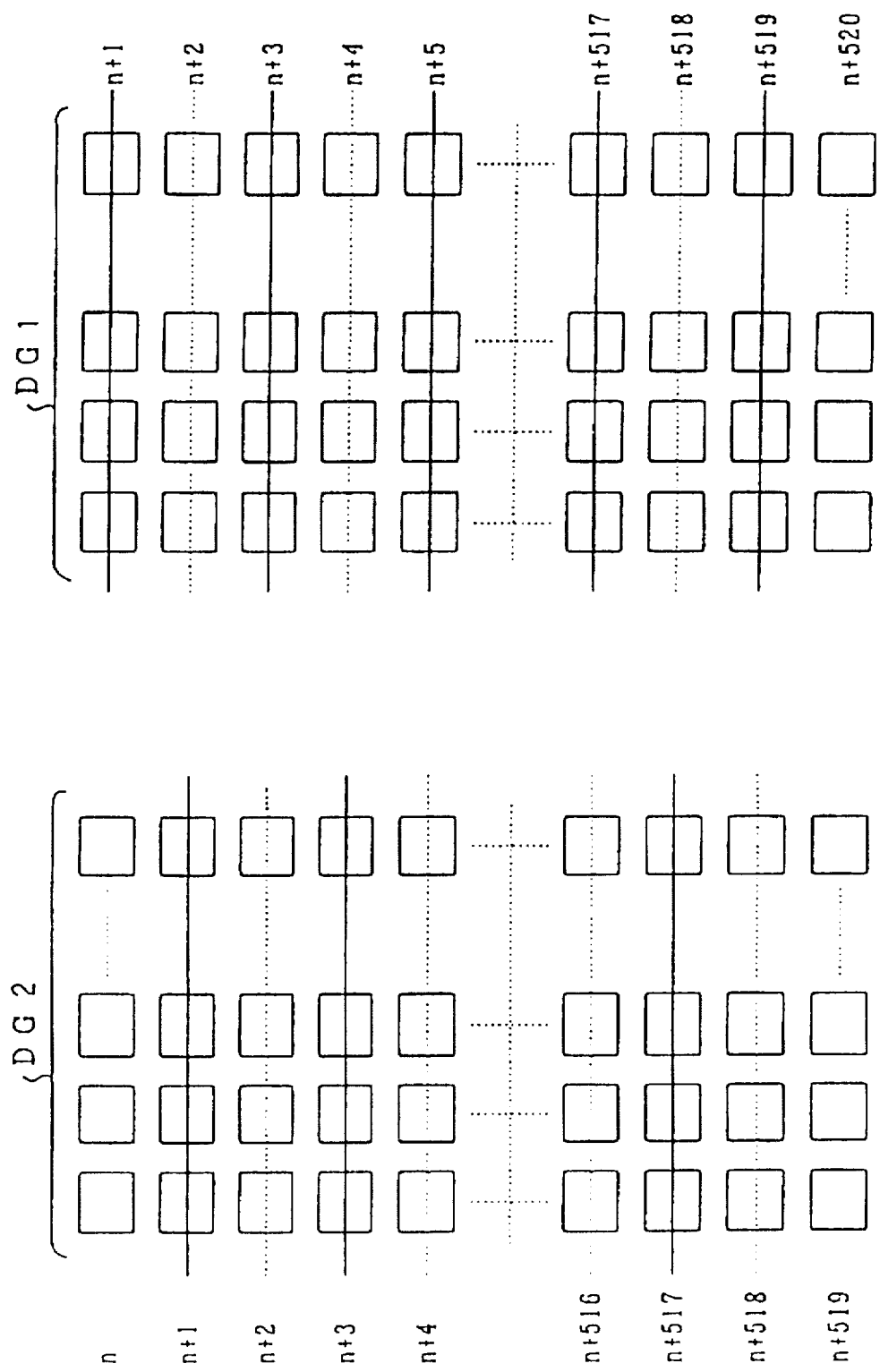
FIG. 8 is an illustration of this invention partially showing image sensors having a vertical positional offset.

As shown in FIG. 6B, the image sensors DG1 and DG2 are arranged with a vertical one pixel pitch offset therebetween, that is, there is an interlace relation between the image sensors DG1 and DG2. FIG. 8 is an illustration of this invention partially showing image sensors having a vertical positional offset. In the drawing, references "n+m" represents the order of horizontal lines of image sensor DG1 and DG2 and the image area WW of the Hi-Vision system ranges from n+1 to n+518 line. The example in FIG. 8 represents the case that the image sensor DG1 is shifted upwardly from the image sensor DG2. However, it is also possible that the image sensor DG1 is shifted downwardly from the image sensor DG2.

The image sensors DG1 and DG2 are driven together with the other image sensors DG and DR at the same time. That is, when a video signal of an even field is read from the image sensor DG1, a video signal of even field is read from the image sensor DG2 also. The video signal of an odd field are read similarly. Referring to FIG. 8, when a video signal is read from the horizontal line of the image sensor DG1 denoted by a solid line, the video signal from the image sensor DG2 is read form the same horizontal line denoted by a solid line. Similarly, when the video signal is read from the horizontal line of the image sensor DG1 denoted with a chain line, the video signal from the image sensor DG2 is read from the same horizontal line.

A technique of providing a higher resolution in the horizontal direction will be described. The horizontal resolution of the Hi-Vision is not specified. Therefore, it is also possible that the number of pixels in the horizontal direction included in the image area of the Hi-Vision is not changed from the horizontal lines 808 as it is. However, the Hi-Vision system aims to provide a clear image having a higher resolution. Therefore, it is favourable that the horizontal resolution is increased. In this invention, the horizontal resolution is increased by arranging tile image sensor DG1 and DG2 with a half horizontal pixel pitch shifted therebetween as shown in FIG. 6C. FIG. 9 is an illustration of this invention partially showing image sensors having a horizontal positional offset.

As mentioned, the image sensors DB and DR are vertically shifted by a half of vertical pixel pitch and the image sensor DG 1 is vertically shifted by one vertical pixel pitch and horizontally shifted by a half of the horizontal pixel pitch respectively.

Figure 10:
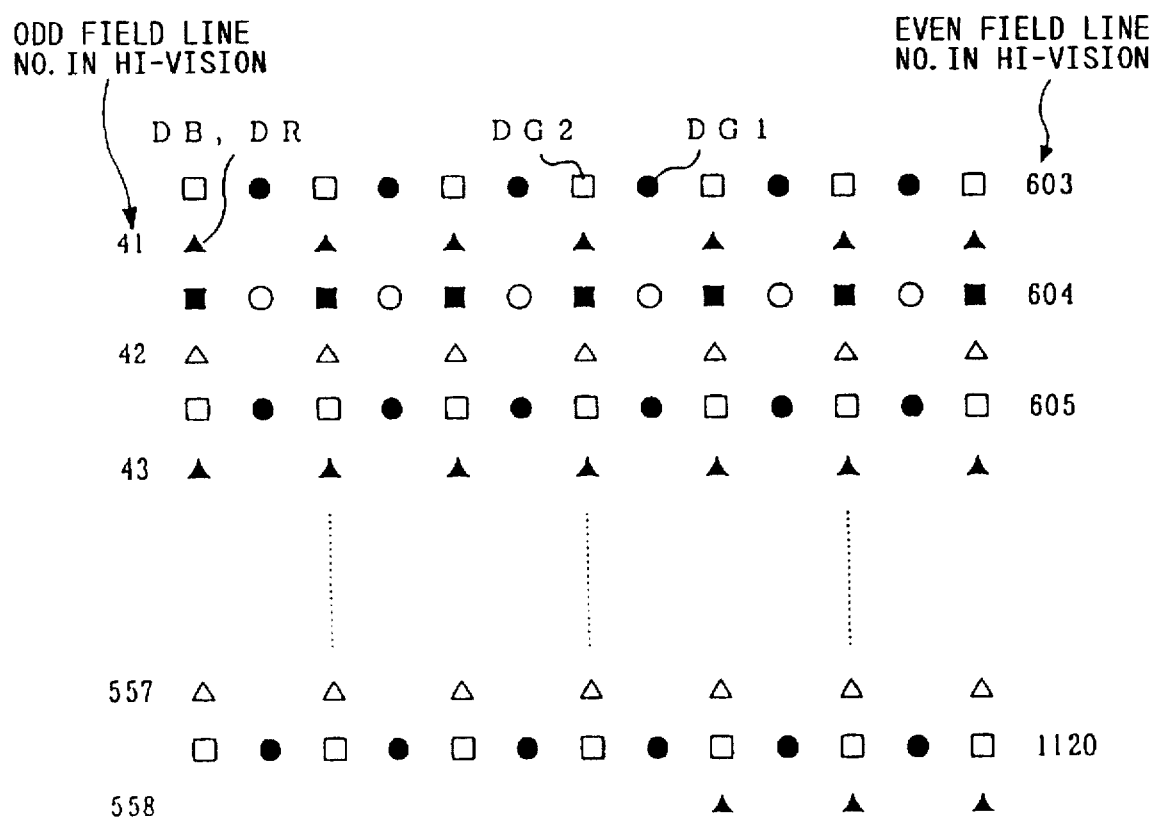
FIG. 10 is an illustration of the first and second embodiments showing the arrangement of pixels of the image sensors.

Arrangement of pixels of the image sensors DG1, DG2, and DR shown in the Hi-Vision image area will be described. FIG. 10 is an illustration of the first and second embodiments showing the arrangement of pixels of the image sensors DG1, DG2, and DR shown in the Hi-Vision image area. In FIG. 10, non-painted square marks corresponds even field pixels of the image sensor DG2, painted square marks corresponds odd field pixels of the image sensor DG2, non-painted circle marks correspond even field pixels of the image sensor DG1, painted circle marks correspond odd field pixels of the image sensor DG1, non-painted triangle marks correspond even field pixels of the image sensor DB or DR, painted square marks correspond odd field pixels of the image sensors DB or DR, and numerals represents line numbers of the Hi-Vision screen.

At first, observe pixels represented by square and circle marks. Because the image sensors DG1 and DG2 are arranged with the horizontal offset by a half of the horizontal pixel pitch, the fields of pixels derived from the image sensors DG1 and DG2 are arranged alternately in the horizontal direction on the Hi-Vision screen. Moreover, because the image sensors DG1 and DG2 are arranged with the vertical offset by the one horizontal pixel pitch, fields of pixels derived from the image sensors DG1 and DG2 on the same horizontal lines are different each other. That is, painted and non-painted square marks are arranged alternately in the horizontal direction.

In the vertical direction, even and odd fields occur alternately, painted and non-painted square marks are arranged alternately in the vertical direction. These pixels belong to an even field in the Hi-Vision, i.e., from 603 line to 1120 lines. However, non-painted mark pixels are read as odd field pixels of respective image sensors and painted mark pixels are read as even field pixels of respective image sensors.

Then, pixels marked by triangle marks are observed. Because the image sensors DB and DR are arranged with a vertical offset by a half of vertical pixel pitch from the image sensors DG1 and DG2, they are arranged between the pixels derived from the image sensors DG1 and DG2. Pixels of the image sensors DB and DR are overlapped and thus, one triangle mark correspond both pixels derived from the image sensors DB and DR. These pixels locates on 41th to 558th lines which belong an odd field. However, non-painted mark pixels are read during odd fields of the image sensors and painted mark pixels are read during even fields of the image sensors.

Figure 11:
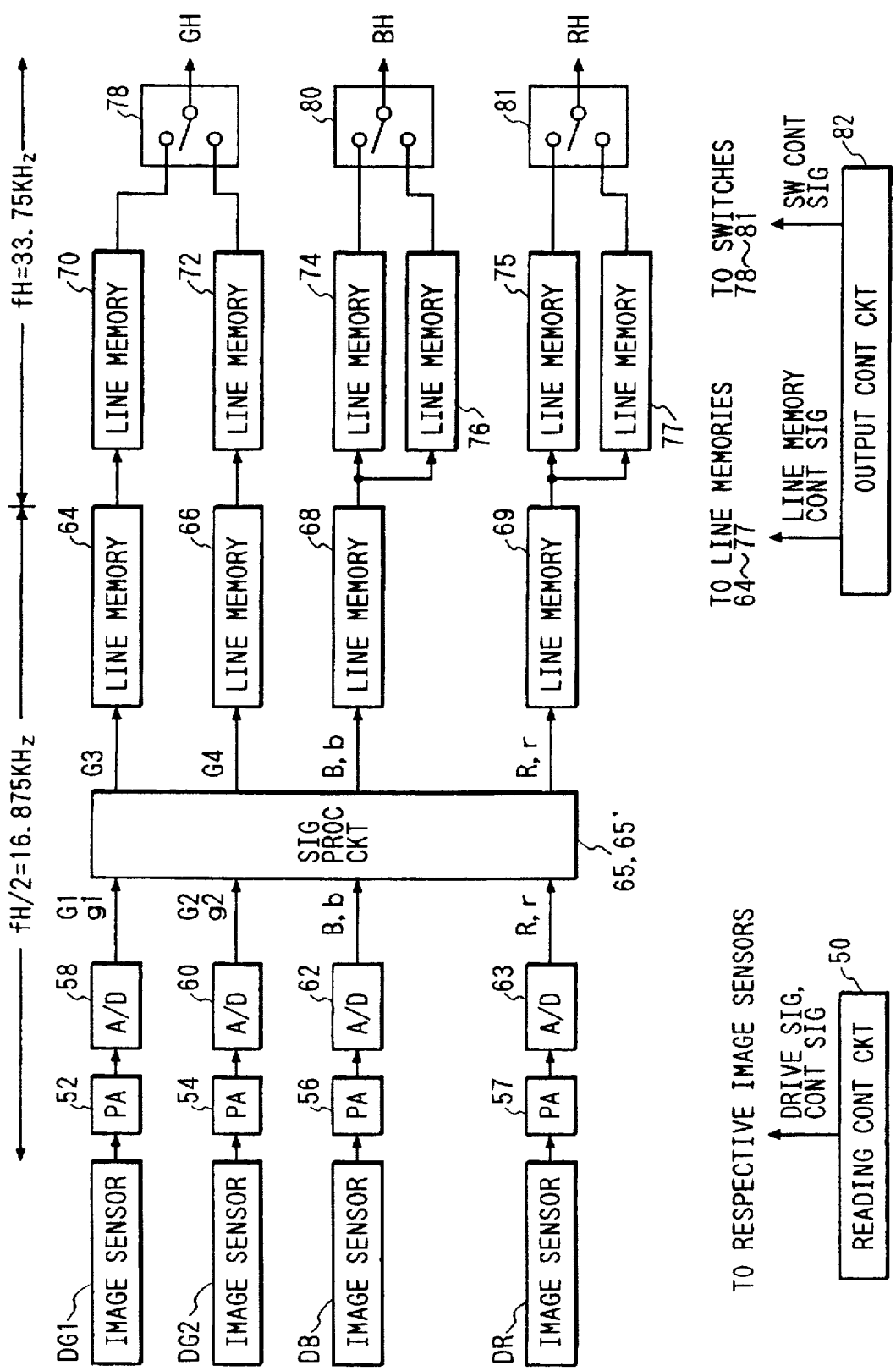
FIG. 11 is a block diagram of this invention showing a signal reading circuit.

An operation of reading charge signals and an operation of conversion processing will be described. FIG. 11 is a block diagram of this invention showing a signal reading circuit. A reading control circuit 50 supplies drive signals and reading control signals for reading the charge signals within the image area to respective image sensors. The image sensors DG1, DG2, DB, and DR are driven by the drive signals and reading control signal at the same time to supply charge signals to preamplifiers 52 to 57. The preamplifiers 52 to 57 amplify the charge signals from the image sensors DG1, DG2, DB, and DR. Analog outputs of the preamplifiers 52 to 57 are a/d-converted by a/d converters 58 to 63 into digital video signals. That is, the a/d converter 58 supplies digital video signals of an odd green signal G1 and an even field green signal g1 from the image sensor DG1 to a signal processing circuit 65. The a/d converter 60 supplies digital video signals of an odd green signal G2 and an even field green signal g2 from the image sensor DG2 to the signal processing circuit 65. The a/d converter 62 supplies digital video signals of an odd blue signal B and an even field blue signal b from the image sensor DB to the signal processing circuit 65. The a/d converter 63 supplies digital video signals of an odd red signal R and an even field red signal r from the image sensor DR to the signal processing circuit 65.

Outputs G3 and G4 of the signal processing circuit 65 are supplied to line memories 64 and 66 respectively. Outputs of the line memory 64 and 66 are supplied to line memories 70 and 72 respectively. Outputs of the line memories 70 and 72 are supplied to a line selection switch 78 supplied with a line memory control signal from the output control circuit 82. The switch 78 alternatively outputs the outputs of the line memories 70 and 72 as a signal GH in accordance with the line memory control signal from the output control circuit 82 line by line.

Outputs of B and b from the signal processing circuit 65 are supplied to a line memory 68. An output of the line memory 68 is supplied to line memories 74 and 76. The line memory 77 performs data interpolation. Outputs of the line memories 74 and 76 are supplied to a line selection switch 80 supplied with a line memory control signal from the output control circuit 82. The line selection switch 80 outputs either of the outputs of the line memories 74 and 76 as a signal BH in accordance with the line memory control signal from the output control circuit 82. That is, the line selection switch 80 alternately outputs the outputs of the line memories 74 and 76 line by line.

Outputs of R and r from the signal processing circuit 65 are supplied to a line memory 69. An output of the line memory 69 is supplied to line memories 75 and 77. The line memory 77 performs data interpolation. Outputs of the line memories 75 and 77 are supplied to a line selection switch 81 supplied with a line memory control signal from the output control circuit 82. The line selection switch 81 outputs either of the outputs of the line memories 75 and 77 as a signal RH in accordance with the line memory control signal from the output control circuit 82. That is, the line selection switch 81 alternately outputs the outputs of the line memories 75 and 77 line by line.

Figure 12:
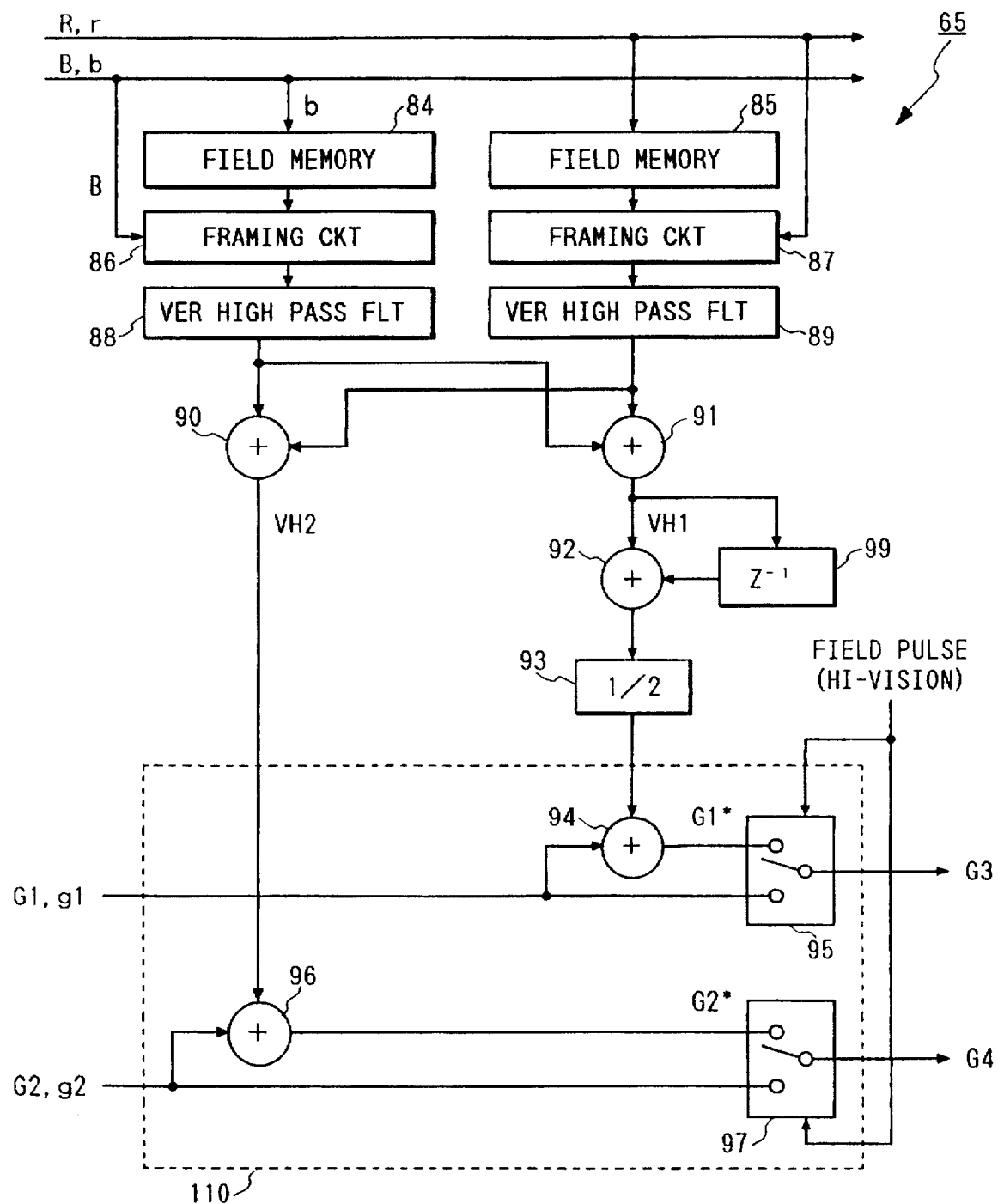
FIG. 12 is a block diagram of the first and second embodiments of the signal processing circuit 65 in FIG. 11.

FIG. 12 is a block diagram of the first and second embodiments of the signal processing circuit 65 in FIG. 11. The digital video signals of an odd blue signal B and an even field blue signal b from the a/d converter 62 are supplied to a field memory 84 and a framing circuit 86 respectively and outputted as they are. The framing circuit 84 provides a framed blue signal by combining one field delayed blue signal b by the field memory 84 with non-delayed blue signal B. Similarly, the digital video signals of an odd field red signal R and an even field red signal r from the a/d converter 63 are supplied to a field memory 85 and a framing circuit 87 respectively and outputted as they are. The framing circuit 87 produces a framed red signal.

The framed blue signal is supplied to a vertical high pass filter 88. The vertical high pass filter 88 extracts a vertical high frequency component from the framed blue signal and supplies it to adders 90 and 91. Similarly, a vertical high pass filter 89 extracts a vertical high frequency component from the framed red signal and supplies it to adders 90 and 91. The adder 90 supplies a vertical high frequency component VH2 and adder 91 supplies a vertical high frequency component VH1. The vertical high frequency component VH2 is added to the green signals G2 and g2 by an adder 96. An output G2* of the adder 96 and the green signals G2 and g2 are supplied to a switch 97.

The vertical high frequency component VH1 is one-pixel-interval delayed by a delay circuit 99. The output VH1 of the adder 91 and an output of the delay circuit 99 is add by an adder 92. An output of the adder 92 is multiplied with 0.5 by a multiplier 93 and the multiplied output is added to the green signals G1 and g1 by an adder 94. The output signal G1* of the adder 94 and the green signals G1 and g1 are supplied to switch 95. The switch 95 outputs either of the signal G1* or the green signals G1 and g1 as an output G3 of the signal processing circuit 85 in accordance with a field pulse.

The added signal G2* and the green signals G2 and g2 are supplied to switch 97. The switch 97 outputs either of the signal G2* or the green signals G2 and g2 as an output G4 of the signal processing circuit 85 in accordance with the field pulse.

Figure 13:
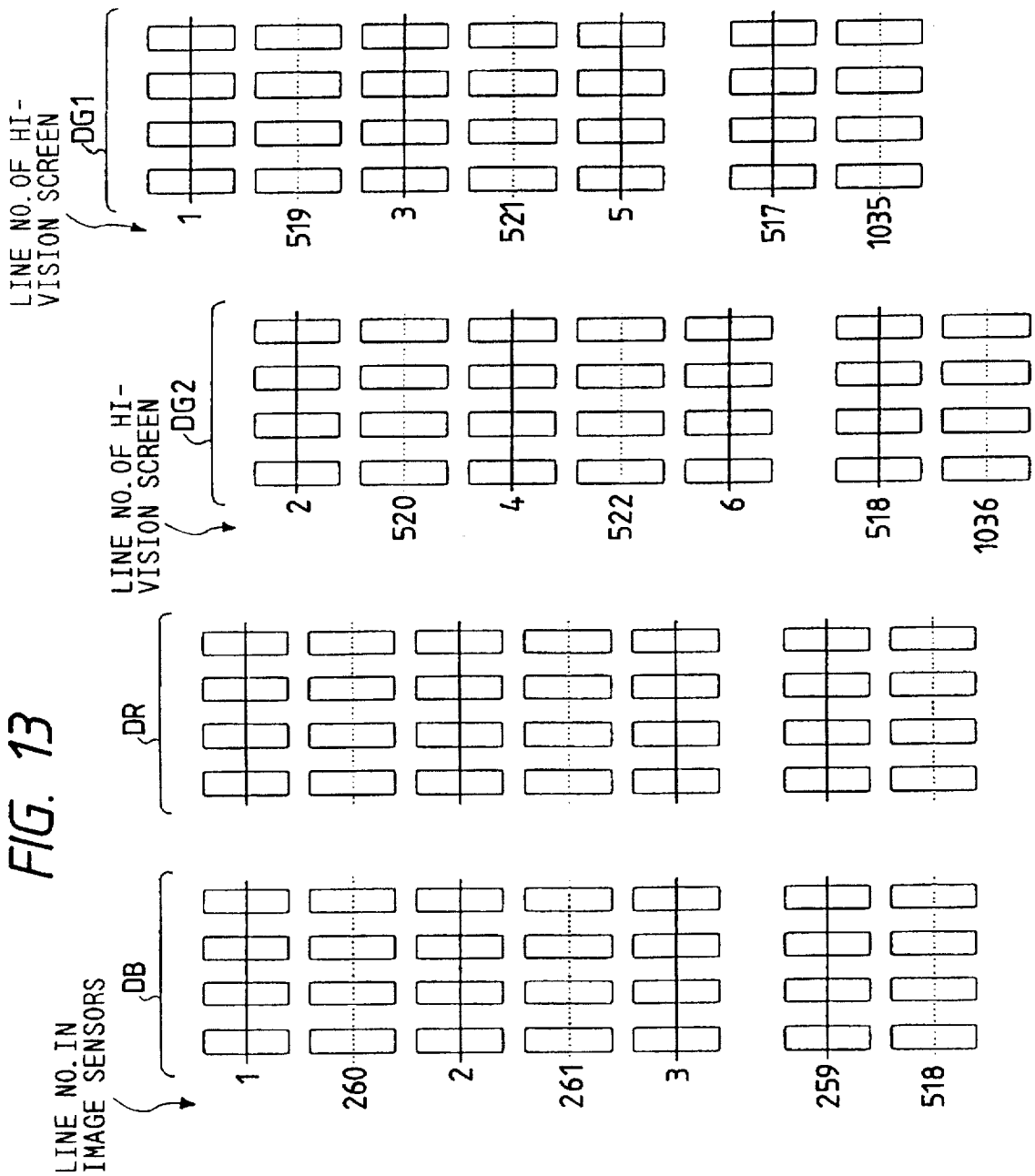
FIG. 13 is an illustration of the first and second embodiments showing image sensors showing an order of line scanning.

This operation will be described more specifically. FIG. 13 is an illustration of the first and second embodiments showing image sensors showing an order of line scanning. In FIG. 13, numerals denotes the order of line scanning wherein numerals of image sensors DG1 and DG2 shows the order of line scanning of the Hi-Vision screen. As shown, blue and red signals are read every two lines of image sensors to provide odd and even field signals. On the other hand, green signals are read from the image sensors DG1 and DG2 as shown in FIG. 8. Therefore, a first Field of the Hi-Vision image is formed by the signals denoted by solid lines in FIG. 8 and a second field of the Hi-Vision image is formed by the signals denoted by chain lines in FIG. 8.

Return to FIG. 11, a frequency of signals used in the stage From reading of the image sensors DG1, DG2, DB, and DR to storing color data in the line memories 64, 66, 68, and 69 is a half of the scanning frequency of the Hi-Vision system, that is, 16. 875 KHz. The image sensors DG1, DG2, DB, and DR are designed for the PAL system and in the PAL system the frequency of scanning frequency is 15. 625 KHz. Therefore, this scanning frequency is approximately equal to the frequency of scanning frequency of the PAL system and the video signals from the image sensors DG1, DG2, DB, and DR can be read at that frequency without a special modification. On the other hand, at the stage after the line memories 70, 72, 74, 76, 75, and 77, video signals are processed with a frequency fH of the Hi-Vision system. That is, the video signals are outputted at a frequency twice the frequency of reading the image sensors DG1, DG2, DB, and DR. This technique of reading charges in the image sensors is similar to the conventional charge reading technique except the reading frequency fH.

The line memories 64, 66, 68, and 69 stores the outputs (color signal data) of one line from the signal processing circuit 65 and when one line of color data has been stored, the line memories supply color signal data of one line to line memories 70, 72, 74, 75, 76, and 77 at the following stage in parallel. The data stored in the line memories 70, 72, 74, 75, 76, and 77 are outputted at a speed twice the reading speed of the image sensors.

The line selection switch 78 alternately outputs green signals G3 and G4 stored in the line memories 70 and 72 every one line to perform scanning conversion. The line selection switch 80 alternately outputs blue signals B and b stored in the line memories 74 and 76 every one line to perform data interpolation wherein the read clock signal has a half of the frequency of the read clock signal for memories 70 and 72. The operation of the line selection switch 81 is similar to that of the line selection switch 81 and is controlled by the output control circuit 82.

The outputs GH, BH, and RH of the switches 78, 80, and 81 are converted into Hi-Vision signals Y, PB, and PR by a matrix (not shown). The conversion is given by:

$$Y=0.715G+0.0721B+0.2125R$$

$$PB=0.5389 (-0.7154G+0.9279B-0.2125R)$$

$$PR=0.6349 (-0.7154G-0.0721B+0.7875R)$$

The signal processing circuit 65 will be described more specifically with reference to FIG. 12. The digital video signals of an odd blue signal B and the even field blue signal b from the a/d converter 62 are supplied to a field memory 84 and the framing circuit 86 respectively and are also outputted as they are. The framing circuit 86 forms a framed blue signal by combining one field delayed blue signal b by the field memory 84 with non-delayed blue signal B. Similarly, the digital video signals of an odd field red signal R and the even field red signal r from the a/d converter 63 are supplied to a field memory 85 and a framing circuit 87 respectively and outputted as they are. The framing circuit 87 produces the framed red signal. Therefore, images represented by painted and non-painted triangle marks shown in FIG. 10 are produced.

The framed blue signal is supplied to a vertical high pass filter 88. The vertical high pass filter 88 extracts a vertical high frequency component from the framed blue signal and supplies it to adders 90 and 91. Similarly, a vertical high pass filter 89 extracts a vertical high frequency component from the framed red signal and supplies it to adders 90 and 91. The adder 90 supplies a vertical high frequency component VH2 and adder 91 supplies a vertical high frequency component VH1. The vertical high frequency component VH2 is added to the green signals G2 and g2 by an adder 96.

This operation will be described more specifically. FIG. 14 is an illustration of the first and second embodiments showing pixels numbered on the Hi-Vision screen. In FIG. 14, capital letters G, B, and R denote pixels read in an odd field and small letters g, b, and r denote pixels read in an even field and "G" and "g" denote green signals and "R" and "r" denote red signals and "1" and "2" denote pixels read from the image sensors DG1 and DG2 respectively.

For example, "G2m−1, n−2" at upper left most section in FIG. 14 corresponds the non-painted square mark pixel at the upper left most position in FIG. 10

As pixels are denoted above, the vertical high pass filters 88 and 89, and adders 90 and 91 execute operations using signals B, b, R, and r in accordance with EQs. (1) and (2) to generate high frequency components VH1 and VH2.

$$VH1_{m,n} = \frac{\left\{\left(\frac{R_{m,n-1}+B_{m,n-1}}{2}\right)+\left(\frac{R_{m,n}+B_{m,n}}{2}\right)\right\} - (r_{m,n}+b_{m,n})}{4} \quad (1)$$

$$VH2_{m,n} = \frac{\left\{\left(\frac{r_{m,n}+b_{m,n}}{2}\right)+\left(\frac{r_{m,n+1}+b_{m,n+1}}{2}\right)\right\} - (R_{m,n}+B_{m,n})}{4} \quad (2)$$

Simply describing, this is an operation of subtracting a signal of a pixel vertically adjacent to the target pixel from a signal of the target pixel with respect to the signals B, b, R, and r signals. That is, this corresponds an operation determining a change in the vertical direction. This provides a vertical high frequency component. FIG. 15 is an illustration of the first and second embodiments showing the vertical high frequency components VH1 and VH2 determined by the signals B, b, R, and r which are represented with reference to the signals G and g.

The vertical high frequency component VH1 is delayed by one pixel interval by the delay 99 and is added to the output of the delay 99 by the adder 92. The output of the adder 92 is subjected to a multiplying with ½ by the multiplier 93. The output of the multiplier 93 is added to the signal G1 by the adder 94. That is, an operation represented by Eq. (3) is executed to provide the signal G1* to which the vertical high frequency component is added. On the other hand, the vertical component VH2 is subjected to addition by the adder 96 in accordance with EQ. (4) to provide the signal G2* to which the vertical high frequency component is added.

$$G1^*_{m,n} = G1_{m,n} + \frac{VH1_{m,n} + VH1_{m+1,n}}{2} \quad (3)$$

$$G2^*_{m,n} = G2_{m,n} + VH2_{m,n} \quad (4)$$

FIG. 16 is an illustration of this invention showing pixels represented by the signal G1* and G2* to which vertical high frequency components are added. The signal G1* and G2* are used for forming a first field image of the Hi-Vision image and the video signals g1, and g2 from the image sensors are used for forming a second field image of the Hi-Vision image. Such a switching effected every field is executed by the switches 95 and 97 in accordance with the field pulse to supply the signals G3 and G4.

Then, a general operation of the signal reading circuit will be described. The image sensors DG1, DG2, DB, and DR are driven at the same time by drive signals from the reading control circuit 50 and signals of even and odd fields are outputted alternately. These signals are amplified by the preamplifiers 52, 54, 56, and 57 and a/d converted by the a/d converters 58, 60, 62, and 63 to supply digital signals to the signal processing circuit 65. The signal processing circuit 65 effects operations represented by EQs. (1) to (4) to supply the signals G1* and G2*. The switches 95 and 97 supply signals G1* and G2* and green signals G1, g1, and G2 and g2 are alternately outputted every field as output signals G3 and G4 together with the blue signals B and b and red signals R and r.

These signals are stored in the line memories 64, 66, 68, and 69. When one line of data of these signals are stored in these line memory, the data are read and supplied to the line memories 70, 72, 74, 75, 76, and 77 at a high frequency. The data of these signals are read at the frequency twice the reading frequency of the image sensors.

Then, the line selection switch 78 alternately outputs the signals G3 and G4 stored in the line memories 70 and 72 to perform the scanning conversion. The line selection switch 80 outputs the signals stored in the line memories 74 and 76 alternately to perform the line interpolation processing. FIG. 17 is a diagram of this invention showing signals outputted by the line memories 74 and 76. Waveform 101 represents the data stored every line in the line memory 74 and waveform 102 represents the data stored every line in the line memory 76. Waveform 103 shows the data read from the line memory 74 and 76 at the frequency fH and alternately selected as shown by waveform 103 to perform the data interpolation. The operation of the line selection switch 81 and the line memories 75 and 77 are similar to this operation.

The signals GH, BH, and RH for reproducing the Hi-Vision image are subjected to the matrix processing as mentioned to provide signals Y, PB, and PR for the Hi-Vision image.

As mentioned earlier, the image on the image sensor DG1 is a reverse image by the half mirror 16, so that this image is inverted compared with the other images on the image sensors DB, DR, and DG2. Therefore, if the image sensor DG1 employs an image sensor capable of outputting a charge signal in either of horizontal directions, the reading control circuit 50 effects a reverse reading to the image sensor DG1. Moreover, it is also possible that the output control circuit 82 perform a reverse reading from the line memories 70 and 72.

Figure 18A:
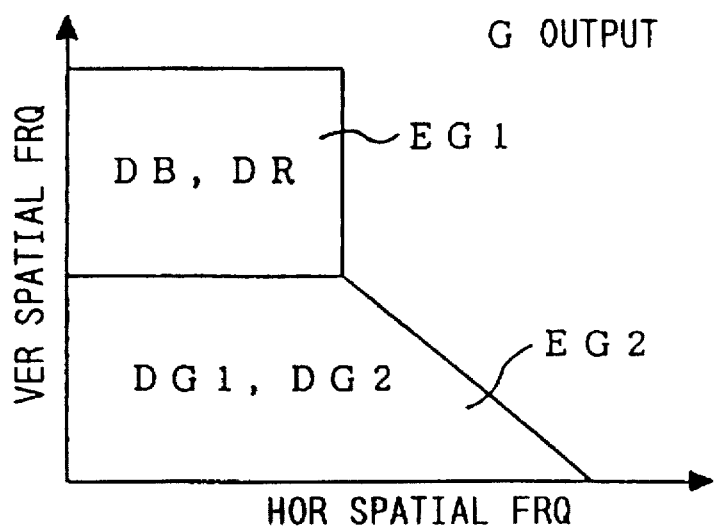
FIG. 18A is a graphic diagram of the first and second embodiments showing a spatial frequency of the green signal.
Figure 18B:
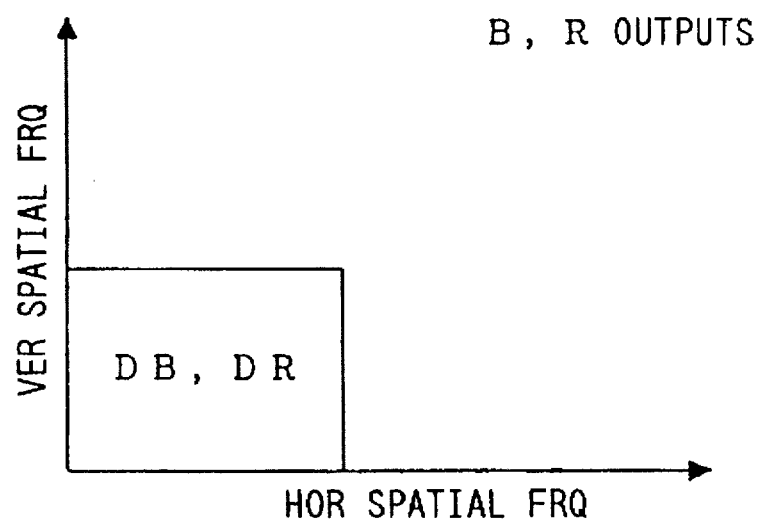
FIG. 18B is a graphic diagram of the first and second embodiments showing spatial frequency distributions of the output signals of B and R.
Figure 18C:
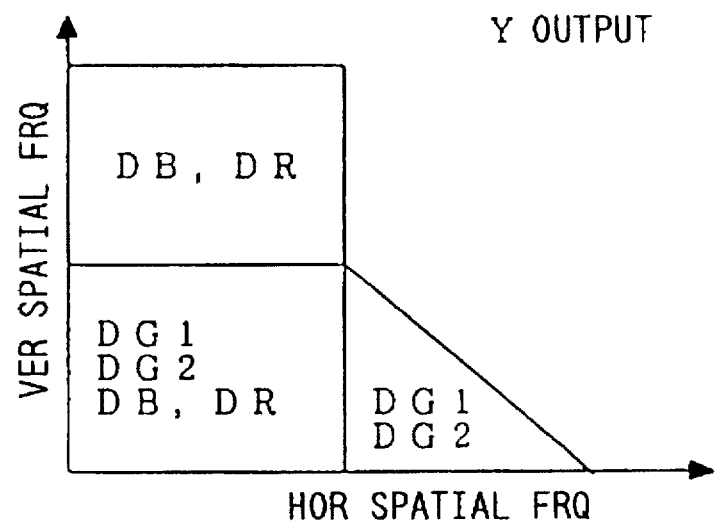
FIG. 18C is a graphic diagram of the first and second embodiments showing a spatial frequency distribution of the luminance signal.

Spatial frequencies of the video signals will be described. FIGS. 18A to 18C are graphic diagrams of this embodiment showing spatial frequency distributions of video signals. Each of axes of abscissas represents a horizontal spatial frequency and each of axes of ordinates represents a vertical spatial frequency. FIG. 18A is a graphic diagram of the first and second embodiments showing a spatial frequency of the green signal G. In FIG. 18A, a region EG1 represents a high frequency component added portion in accordance with the signals B, b, R. Moreover, the region EG2 extends in the horizontal high frequency direction, which is derived from the arrangement of the image sensors DG1 and DG2 a half pixel pitch shifted in the horizontal direction. FIG. 18B is a graphic diagram of the first and second embodiments showing spatial frequency distributions of the output signals of B and R. FIG. 18C is a graphic diagram of the first and second embodiments showing a spatial frequency distribution of the luminance signal Y which mainly contributes the resolution of the Hi-Vision reproduced image and is obtained by combining the spatial frequency distribution of the output signal G in FIG. 18A and the spatial frequency distribution of the output signals B and R in FIG. 18B.

As mentioned, in this embodiment, two image sensors are provided for green color and the image sensors for blue and red color are vertically shifted by one pixel pitch. The resolution of the image of green color is increased in the vertical direction by extracting the vertical high frequency components from the outputs signals of the blue and read image sensors and adding the extracted vertical high frequency component to the video signal of the green color, so that a green color video signal for the Hi-Vision is provided. Therefore, it is possible to ⅓ inch image sensors for the PAL system can be used for the Hi-Vision imaging apparatus. This makes the cost of the imaging apparatus low. The single plate structure is used for the blue and red colors. This is advantageous for miniaturization, lightening, reducing a cost of the imaging apparatus. The resolution is not increased in this embodiment. However, the resolutions of the blue and red colors may be increased by using the green signal having a higher resolution through compensation and interpolation. The image sensors employ ⅓ inch image sensors for the PAL system, so that the reading speed of the charge signals and the processing speed of the charge signal are lower than those for the Hi-Vision. Therefore, it is possible to use currently available circuit devices having a low processing speed. Moreover, a currently available DSP (digital signal processor) can be used before the reading data from the line memories 70, 72, 74, 75, 76, and 77, so that a total cost of the imaging apparatus can be reduced.

A second embodiment will be described.

Figure 19:
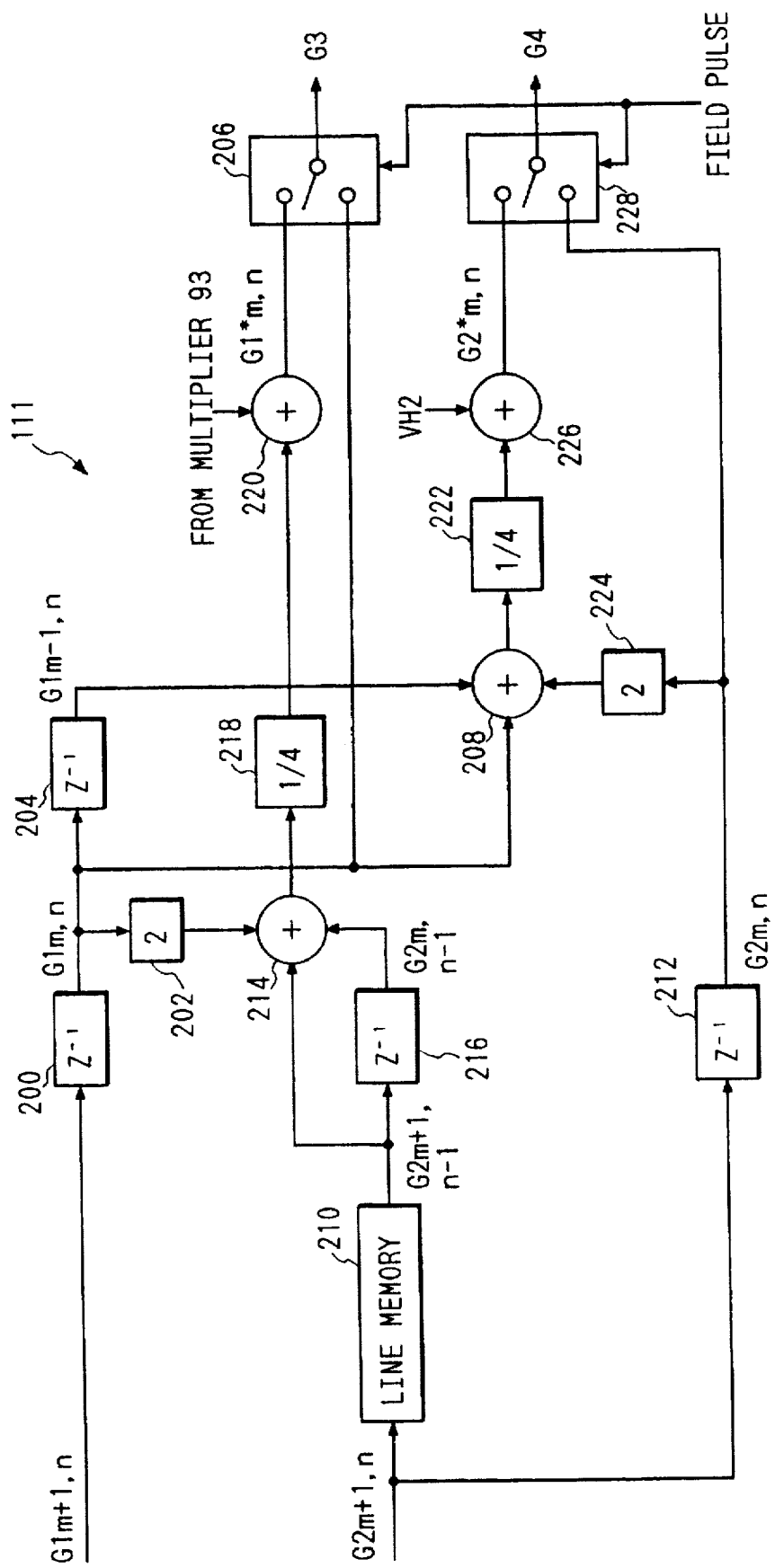
FIG. 19 is a block diagram of the second embodiment of a high frequency component addition circuit.

FIG. 19 is a block diagram of the second embodiment of a high frequency component addition circuit 111 which replaces the high frequency component addition circuit 110 in FIG. 12. In the first embodiment, the vertical high frequency component of the green signal in the region EG1 is derived from the read and blue signals from the image sensors DR and DB using the field memories 84 and 85 and the high frequency component addition signals G1* and G2* are equivalent to video signals of the pixels at the corresponding position. However, because the components of G1m, n and G2m, n providing the components of G1* and G2* in Eqs. (3) and (4) are derived from pixels vertically one pixel pitch shifted, the values of these components may be inaccurate in the special case of the image.

Then, the second embodiment aims to provide components of G1m, n and G2m, n accurately using the components derived from the pixels at the natural positions. Concretely, the high frequency components addition signals G1* and G2* are obtained using Eqs. (5) and (6) in place of Eqs. (3) and (4).

$$G1*_{m,n} = \frac{G2m,n-1 + G2m+1,n-1 + 2G1m,n}{4} + \frac{VH1m,n + VH1m+1,n}{2} \quad (5)$$

$$G2*_{m,n} = \frac{G1m-1,n + G1m,n + 2G2m,n}{4} + VH2m,n \quad (6)$$

Figure 21:
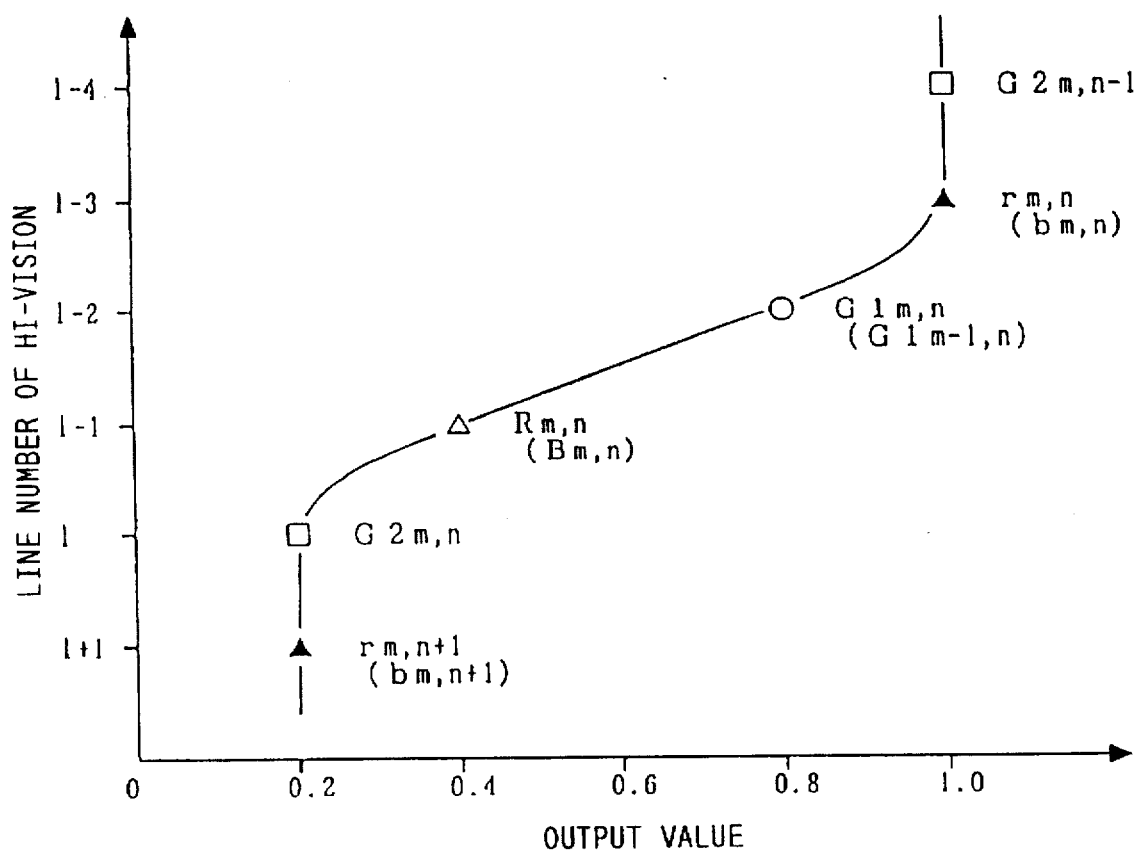
FIG. 21 is a graphic diagram of a prior art showing an example of a change of an output video signal of an achromatic color image in the vertical direction.

FIG. 21 is a graphic diagram of a prior art showing an example of a change of an output video signal of an achromatic color image in the vertical direction. The axis of abscissa represents output values and axis of ordinate represents a vertical position expressed by the scanning line number of the Hi-Vision. In this case,the value of G2* on the scanning line 1—1 is 0.4. However, if this value is obtained using Eq. (4), the value is 0.1. On the other hand, if the value is obtained using Eq. (6), the value is 0.5. Therefore, G2* can be obtained accurately using Eq. (6). Similarly, G1* can be obtained more accurately using Eq. (5).

In FIG. 19, the high frequency component addition circuit 111 comprises a delay circuit 200 for delaying the green signal from the image sensor DG1, a multiplier 202 for multiplying an output of the delay circuit 200 by two, a line memory 210 for temporaly storing the green signal from the image sensor DG2 every one line, a delay circuit 216 for delaying an output of the line memory 210, an adder 214 for summing the output of the line memory 210, an output of the delay circuit 216, and an output of the multiplier 202, a multiplier 218 for dividing an output of the adder 214 by 4, an adder 220 for adding an output of the multiplier 218 to an output of the multiplier 93 in FIG. 12, a switch 206 for outputting either of an output of the adder 220 or the output of the delay 200 in response to the field pulse as the signal G3, a delay 212 for delaying the green signal from the image sensor DG2, a multiplier 224 for multiplying an output of the delay circuit 212 by two, a delay 204 for delaying the output of the delay circuit 200, an adder 208 for summing an output of the delay 204, the output of the delay circuit 200, and an output of the multiplier 224, a multiplier 222 for dividing an output of the adder 208 by four, an adder 226 for adding an output of the multiplier 222 to the vertical high frequency component VH2, a switch 228 for outputting either of an output of the adder 226 or the output of the delay circuit 212 in response to the field pulse as the signal G4. Other structure is the same as the first embodiment.

An operation of the second embodiment will be described. The operation of the second embodiment is the same as the first embodiment except the operation of the vertical high frequency component addition circuit 111. That is, the vertical high frequency components are added in accordance with Eqs. (5) and (6) in place of Eqs. (3) and (4). The first term in Eq. (5) corresponds the output of the multiplier 218 and the output of the adder 220 represents the high frequency component added signal G1*m,n. The output of the multiplier 222 corresponds to the first term of the Eq. (6) and the output of the adder 226 represents the high frequency component added signal G2*m,n.

The other inputs of the switches 206 and 228 are supplied with the color signals from the image sensors DG1 and DG2 delayed by the delay circuits 200 and 212 respectively. The switch 206 selectively outputs either of the output of the adder 220 or the output of the delay circuit 200 in accordance with the field pulse as the signal G3 and the switch 228 selectively outputs either of the output of the adder 226 or the output of the delay circuit 212 in accordance with the field pulse as the signal G4.

Comparing Eq. (3) with Eq. (5), in Eq. (5), the term G2m, n−1+G2m+1, n−1 is considered in addition to the term G1m, n. Referring to FIG. 14, these pixels correspond pixels adjacent to the pixel G1m, n, namely, these pixels locate on one upper line from the pixel G1m, n. This fact applicable to the relation between Eqs. (4) and (6). Such an operation provides an accurate color signal value of the pixel.

Modifications will be described.

There are various modifications of this invention. For example, though in the above-mentioned embodiment, four image sensors including two green image sensors and each image sensors for blue and red are provided, it is possible that the number of image sensors for each color is one but at least one of image sensors for blue and red is vertically shifted from an image sensor for green to obtain a vertical high frequency component. This provides the same effect. That is, according to this invention, there is provided an imaging apparatus for outputting blue, red, green color signals in response to an image ray, comprising: a color separation optical system for separating the image ray into blue, green, and red image rays; a first image sensor DB, having first pixels vertically and horizontally arranged, for receiving the blue image ray and producing the blue color signal; a second image sensor DR, having second pixels vertically and horizontally arranged, for receiving the red image ray and producing the red color signal; and a third image sensor DG2, having third pixels vertically and horizontally arranged, for receiving the green image ray and producing the green color signal, at least one of the first and second pixels respectively having vertical relative offsets against the third pixels to have a relative interlace relation with the third pixels to produce a screen to be produced from the blue, red, green color signals, the screen having a higher resolution than the first to third image sensors. That is, the image sensor DG1 can be omitted.

Moreover, it is also possible that the number of the image sensors for each color is two, that is, a total number of the image sensors is six.

The image sensors DG1 and DG2 are shifted each other by a half pixel pitch to increase the horizontal resolution. However, this structure is not always necessary. That is, it is also possible that the image sensors DG1 and DG2 are not shifted horizontally if it is not required to increase the horizontal resolution.

Moreover, in the above-mentioned embodiments, the image sensor DG2 is vertically shifted by one vertical pixel pitch from the image sensor DG1. However, it is possible that the image sensor DG1 is located at the corresponding portion of the image sensor DG1 and the charge signal is read with one line shifted to provide the similar operation. In this case, one of these image sensors is driven with one line shifted or delayed. However, generally, it is desirable that all image sensors are driven by the same drive signal at the same time. Therefore, that the image sensor DG2 is vertically shifted. This fact is applicable to the positional shift structure of the image sensors in the horizontal direction.

The color signals read from the image sensors may be processed by a digital signal processor (DSP) or the like.

In the above-mentioned embodiment, the aspect ratio is 16:9. However, this invention is applicable to other aspect ratio.

In the above-mentioned embodiments, the Hi-Vision image area WW is set to an approximately vertical middle points of the image sensors. However, it is also possible to arrange the image area WW at any position within the image sensor which position can provide the Hi-Vision image area.

Figure 20A:
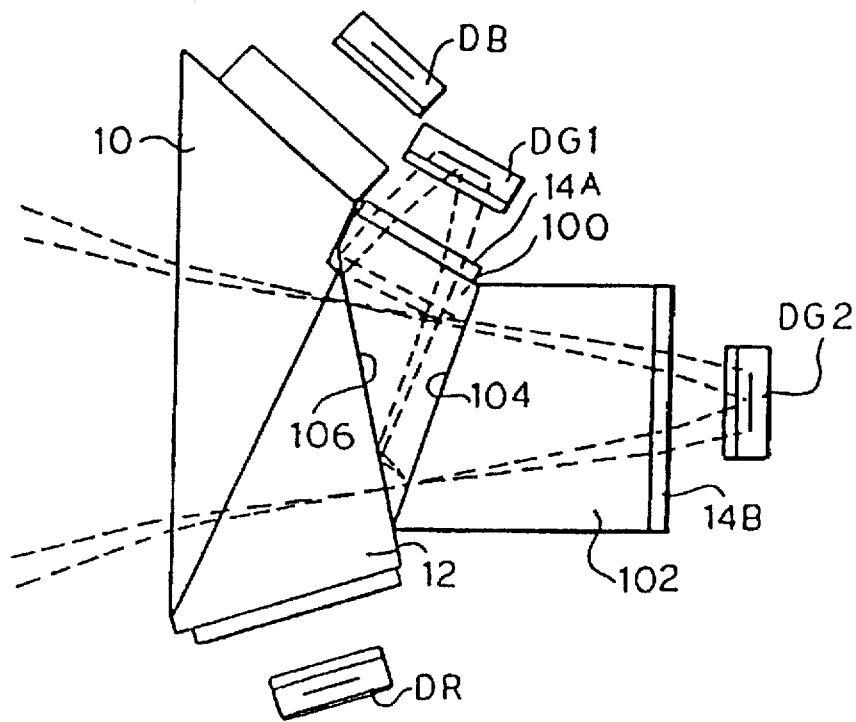
FIGS. 20A and 20B are cross-sectional views of modifications of the optical system for obtaining an erect image for the image sensor DG1.
Figure 20B:
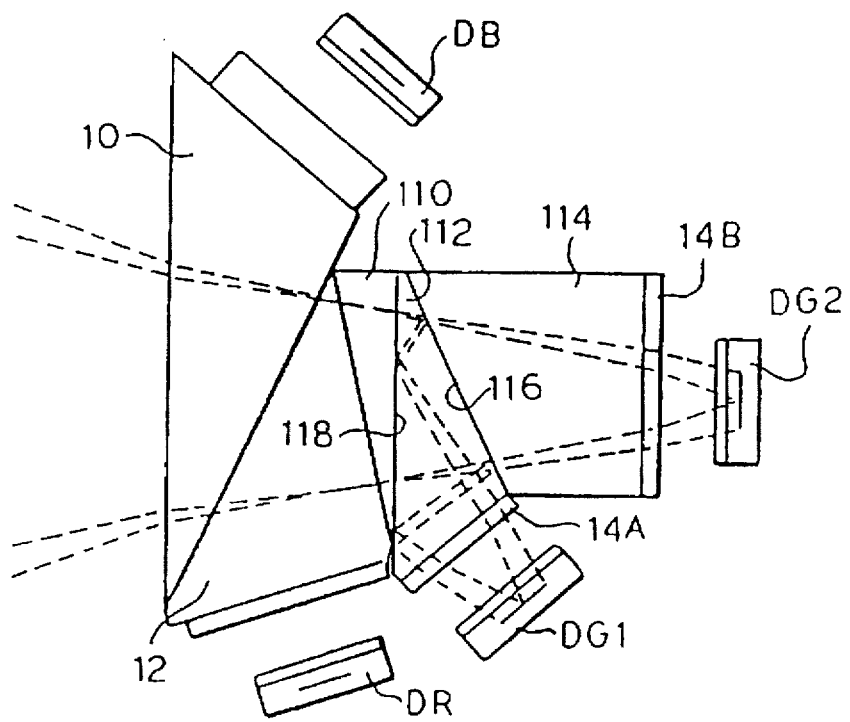

The image sensor DG1 provides the video signal representing a reverse image compared with the other image sensors. Therefore, the image sensor DG1 has a function for reverse reading in the horizontal direction. Alternatively, a line memory is provided for reverse reading. Moreover, it is also possible to provide an erect image by optical system. FIGS. 20A and 20B are cross-sectional views of modifications of the optical system for obtaining an erect image for the image sensor DG1.

In FIG. 20A, a green prism 100 is provided with an air layer between the red prism 12 and green prism 100 and a half mirror 104 is provided between the green prism 100 and the green prism 102.

The green color image ray enters the prism 100 through an incident surface thereof after transmission through the red prism 12. The green color image ray is partially reflected by the half mirror 104 and the reflected green image ray is totally reflected at the incident surface 106 and the green image is focused on the image sensor DG1 through the trimming filter 14A and provide an erect green image on the image sensor DG1. The green image ray partially transmitted through the half mirror 104 is focused on the image sensor DG2 through the trimming filter 14B and provide an erect green image on the image sensor DG2.

In FIG. 20B, a dummy prism 110 contacting with the red prism 12 is provided, a green prism 112 is provided to have an air layer between the dummy prism 110 and the green prism 112, and a half mirror 116 is provided between the green prism 112 and the green prism 114.

The green image ray from the red prism 12 transmits through the dummy prism 110 and enters the green prism 112 through an incident surface 118 of the green prism 112. The green image ray entering the green prism 112 is partially reflected by the half mirror 116. The reflected green image ray is totally reflected by the incident surface 118 and focused on the image sensor DG1 through the trimming filter 14A to have a green image thereon. The green image ray partially transmitted through the half mirror 116 is focused on the image sensor DG2 through the trimming filter 14B to provide another green image on the image sensor DG2.

In the above-mentioned modifications, the green images on both the image sensors DG1 and DG2 are not reverse because the green image rays are reflected twice respectively. Therefore, there is no necessity of reverse reading of the image sensor DG1 and the same image sensor can be used for receiving the green image as the green image sensor DG1.

In the above-mentioned embodiments, image sensors for the PAL system are used. However, it is also possible to use other corresponding image sensors of the other systems.

A third embodiment will be described.

In the above-mentioned embodiment, a field memory is necessary for extracting vertical high frequency components. Therefore, it is desirable to eliminate the necessity of the field memory which is expensive. Moreover, the vertical high frequency component may be provided by no edge image but by a quick motion of the image on the screen. FIG. 28 is an illustration of example images of a prior art on a screen. An image of a vertical bar at a previous field 201 moves rightward in the drawing and the image 202 moved to a new position at the current field 202. In this example of the image moving in the horizontal direction, the image on the current field 202 has no vertical high frequency component with respect to the type of the image. However, the vertical high frequency component was obtained from the difference between the previous field and the current field using the field memory, so that a false vertical high frequency component occurs. This embodiment is provided to improve the imaging apparatus in this point.

Figure 22:
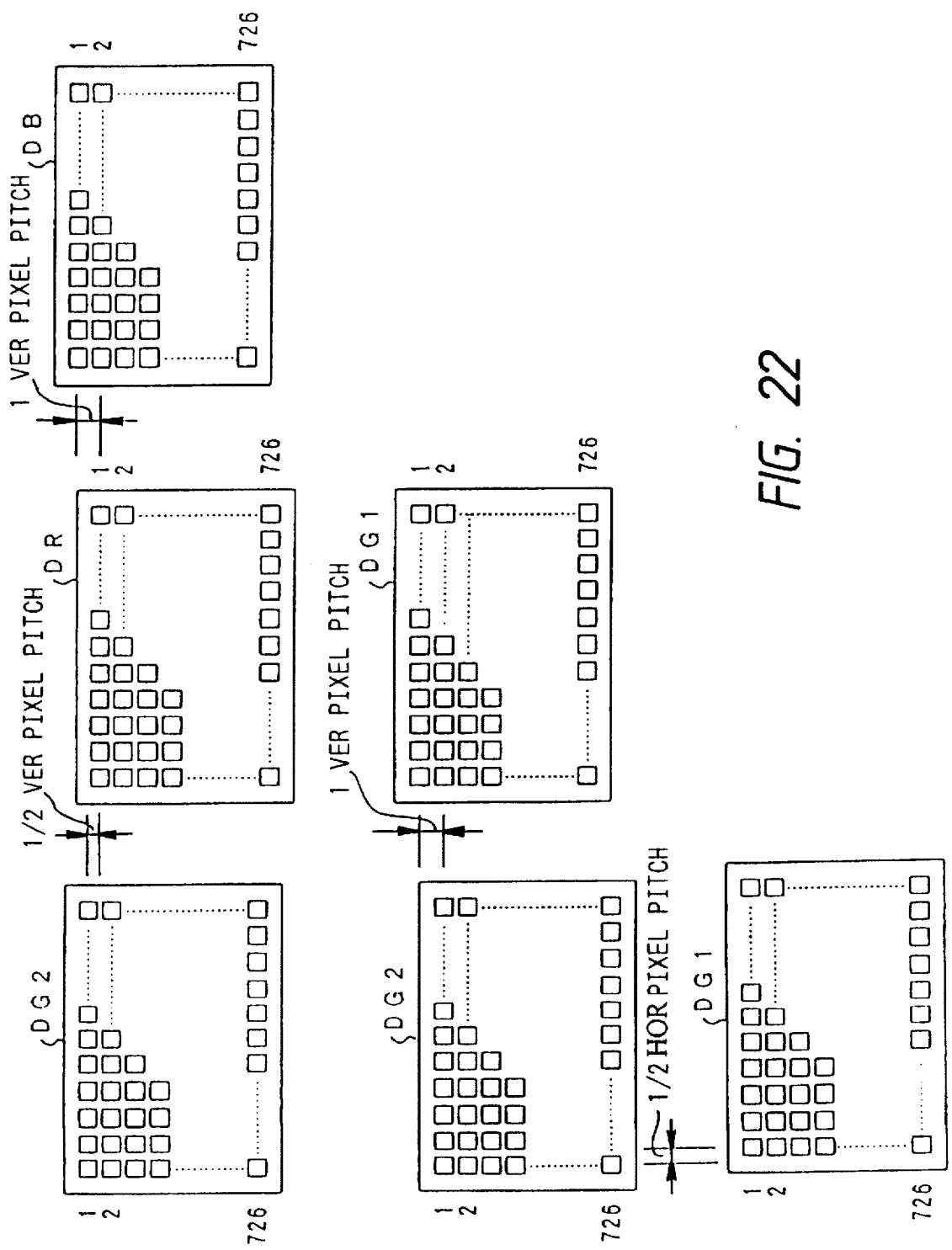
FIG. 22 is an illustration of a third embodiment showing a positional relation among the image sensors.

The imaging apparatus of the third embodiment is basically similar to the imaging apparatus of the first and second embodiment. The difference is in the arrangement of the image sensors and the circuit arrangement of the signal reading circuit. FIG. 22 is an illustration of the third embodiment showing a positional relation among the image sensors DG1, DG2, DB, and DR. In this embodiment, the position of the image sensors are relatively shifted similarly. However, in this embodiment, the image sensor DR for receiving a red color image is vertically shifted from the image sensor DG2 by a half vertical pixel pitch and the image sensor DB for receiving the blue color image is vertically shifted from the image sensor DR by one vertical pixel pitch. More specifically, the image sensor DR is relatively shifted from the image sensor DG2 by a half vertical pixel pitch in a first vertical direction and the image sensor DB is relatively shifted from the image sensor DG2 by the half pixel pitch in a second vertical direction which is opposite to the first vertical direction.

Figure 23:
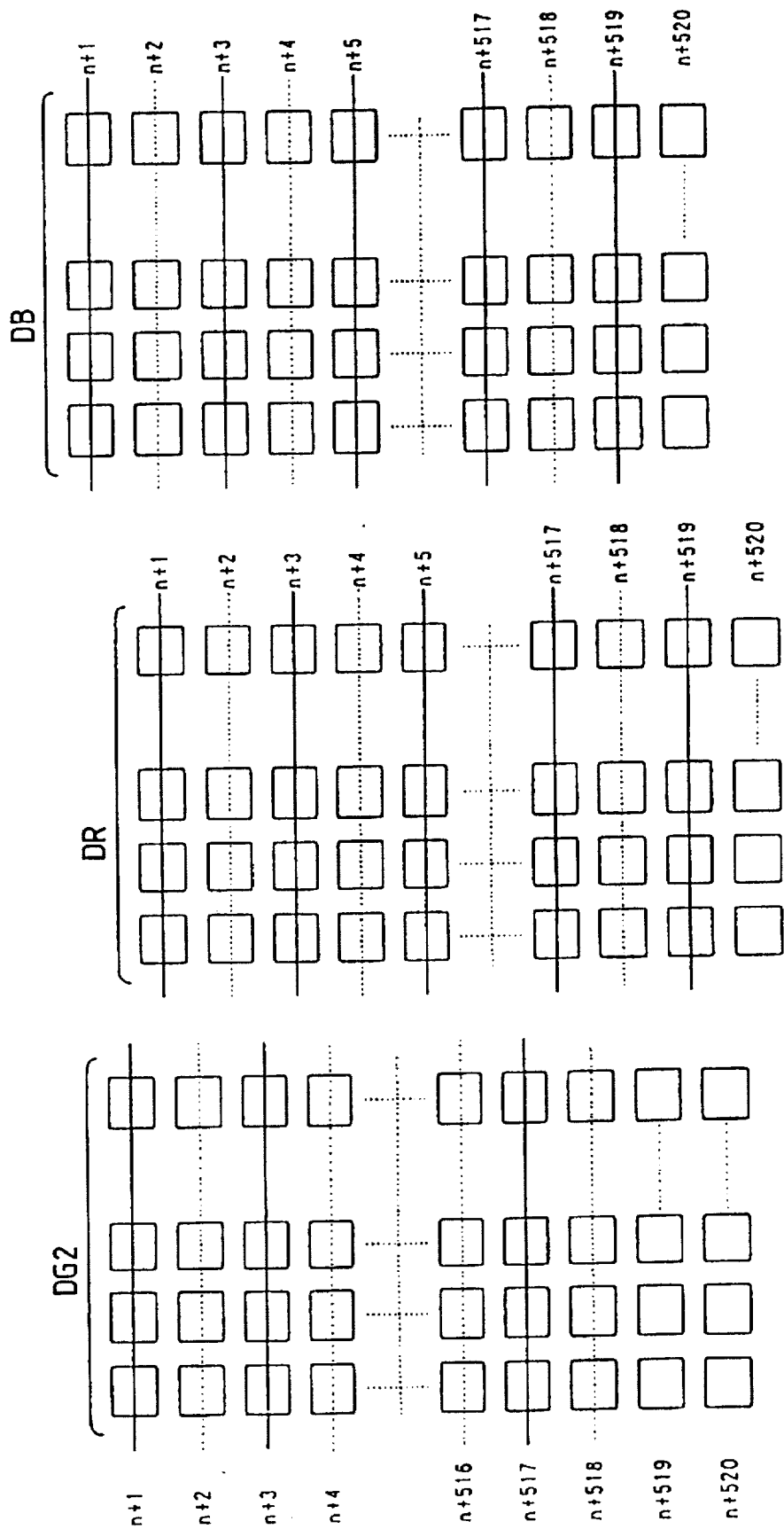
FIG. 23 is an enlarged view of the third embodiment showing a positional relation among image sensors DG2, DR, and DB.

FIG. 23 is an enlarged view of the third embodiment showing a positional relation among image sensors DG2, DR, and DB. In FIG. 23, references "n+m" represent orders of horizontal scanning lines and horizontal lines from "n+1" to "n+518 correspond the image area of the Hi-Vision. The vertical high frequency components are derived from this arrangement of the image sensors through a signal processing circuit mentioned later.

The image sensor DG1 is shifted from the image sensor DG2 by one vertical pixel pitch in the vertical direction and by a half pixel pitch in the horizontal direction as similar to the first and second embodiments.

The image sensors DG1, DG2, DB, and DR are driven at the same timing. That is, when a green signal of an even field is read from the image sensor DG1, color signals of the even field are read in the other image sensors. Similar operation is performed during each odd field. Referring to FIG. 23 and FIG. 8 which was used for the first and second embodiments and also used in the third embodiment showing an arrangement of image sensors DG1 and DG2. In these drawings, when charges in a line denoted by a solid line in the image sensor DG1 are read, charges in horizontal lines denoted by solid lines in the image sensors DG1, DR, and DB are also read out. Similarly, when charges in a line denoted by a chin line in the image sensor DG1 are read, charges in horizontal lines denoted by chain lines in the image sensors DG1, DR, and DB are also read out.

An arrangement of pixels of the image sensors DG1, DG2, DB, and DR on the Hi-Vision will be described.

Figure 24:
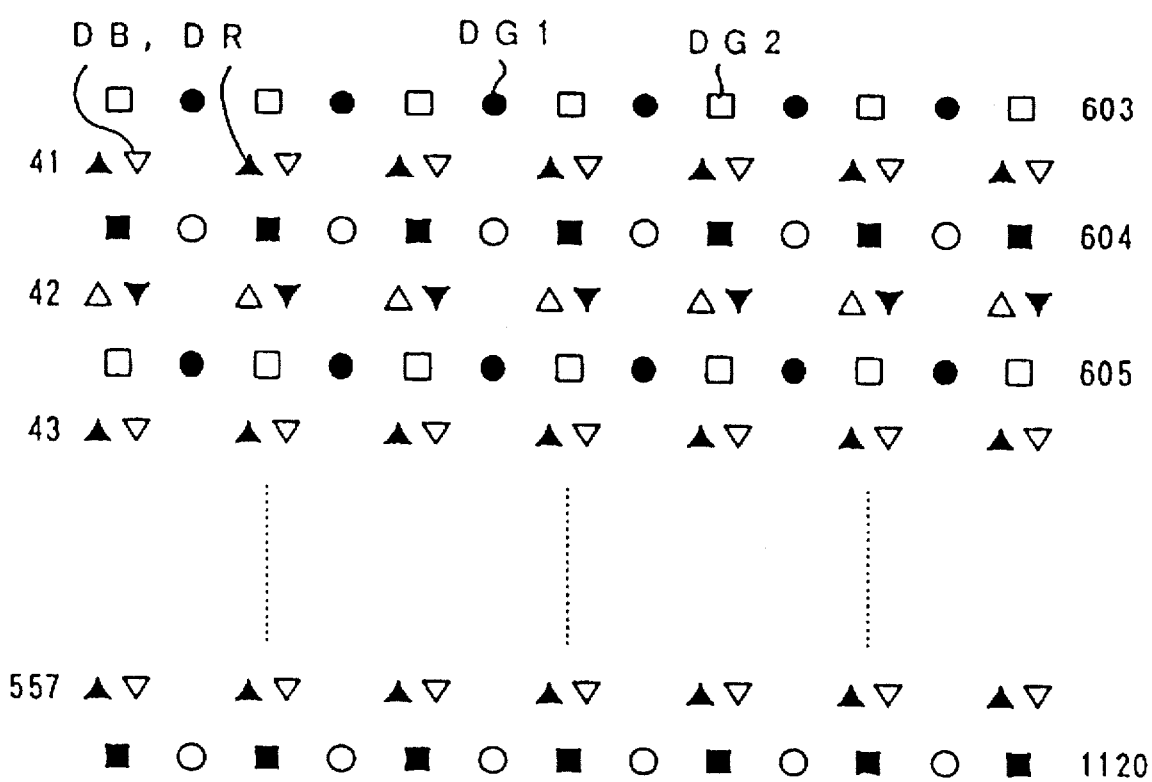
FIG. 24 is an illustration of the third embodiment showing an arrangement of pixels of each color on the Hi-Vision screen.

FIG. 24 is an illustration of the third embodiment showing an arrangement of pixels of each color on the Hi-Vision screen.

In FIG. 24, square marks (□■) represent green pixels read from the image sensor DG2, circle marks (○●) represent green pixels read from the image sensor DG1, triangle marks (△ ▲) represent red pixels read from the image sensor DR, and counter triangle marks (▽ ▼) represent red pixels read from the image sensor DB. Each of marks non-painted represents a pixel of an even field, each of marks painted represents a pixel of an odd field, and numerals denotes line numbers in the Hi-Vision screen.

Referring to square and circle marks, the square and circle marks are arranged alternately because the image sensors DG1 and DG2 are horizontally shifted by a half horizontal pixel pitch and fields of pixels marked by squares and circles on the same scanning line differ each other because the image sensors DG1 and DG2 are vertically shifted by one vertical pixel pitch. That is, painted and non-painted marks (square marks or circle marks) are alternately arranged in the horizontal direction.

Moreover, in the vertical direction, painted and non-painted marks are alternately arranged because pixels of even and odd fields of respective image sensors are arranged alternately. These pixels marked by square and circles are arranged from 603th to 1120th lines on an even field of the Hi-Vision screen. However, with respect to reading of charge signals from the respective images sensors, non-painted mark pixels are read during an even field of the image sensor and painted mark pixels are read during an odd field of the image sensor.

Then, referring to pixels marked by triangles, pixels of the image sensor DR are positioned between two consecutive horizontal line of the image sensor DG2 because the image sensor DR is vertically shifted by a half vertical pixel pitch from the image sensor DG2. That is, pixels marked by the triangles are located between pixels the square marks. On the other hand, pixels marked by triangles and counter triangles locate on the same line but field of these pixels are different each other, i.e., a positional relation between painted and non-painted triangles is opposite to the positional relation between painted and non-painted counter triangles because the image sensor DB is shifted from the image sensor DR by one vertical pixel pitch.

These pixels read from the image sensors DR and DB exist on the 41st to 557th lines included in an odd field of the Hi-Vision screen. However, it is noted that the reading is effected to the pixels denoted by non-painted marks at an odd field of the image sensors and to the pixels denoted by painted marks at an even field of the image sensor. This embodiment is different from the first and second embodiment in the arrangement of the pixels of blue denoted by the painted and non-painted counter triangles.

The circuit arrangement of the signal reading circuit and its operation are the same as the first embodiment except the signal processing circuit. That is, the signal processing circuit 65' has a different structure and a different operation from the signal processing circuit 65 of the first and second embodiments. However, it receives the similar inputs, i.e., outputs of the a/d converters 58, 60, 62, and 63 and outputs, i.e., outputs for the line memories 64, 66, 68, and 69 as shown in FIG. 11.

Figure 25:
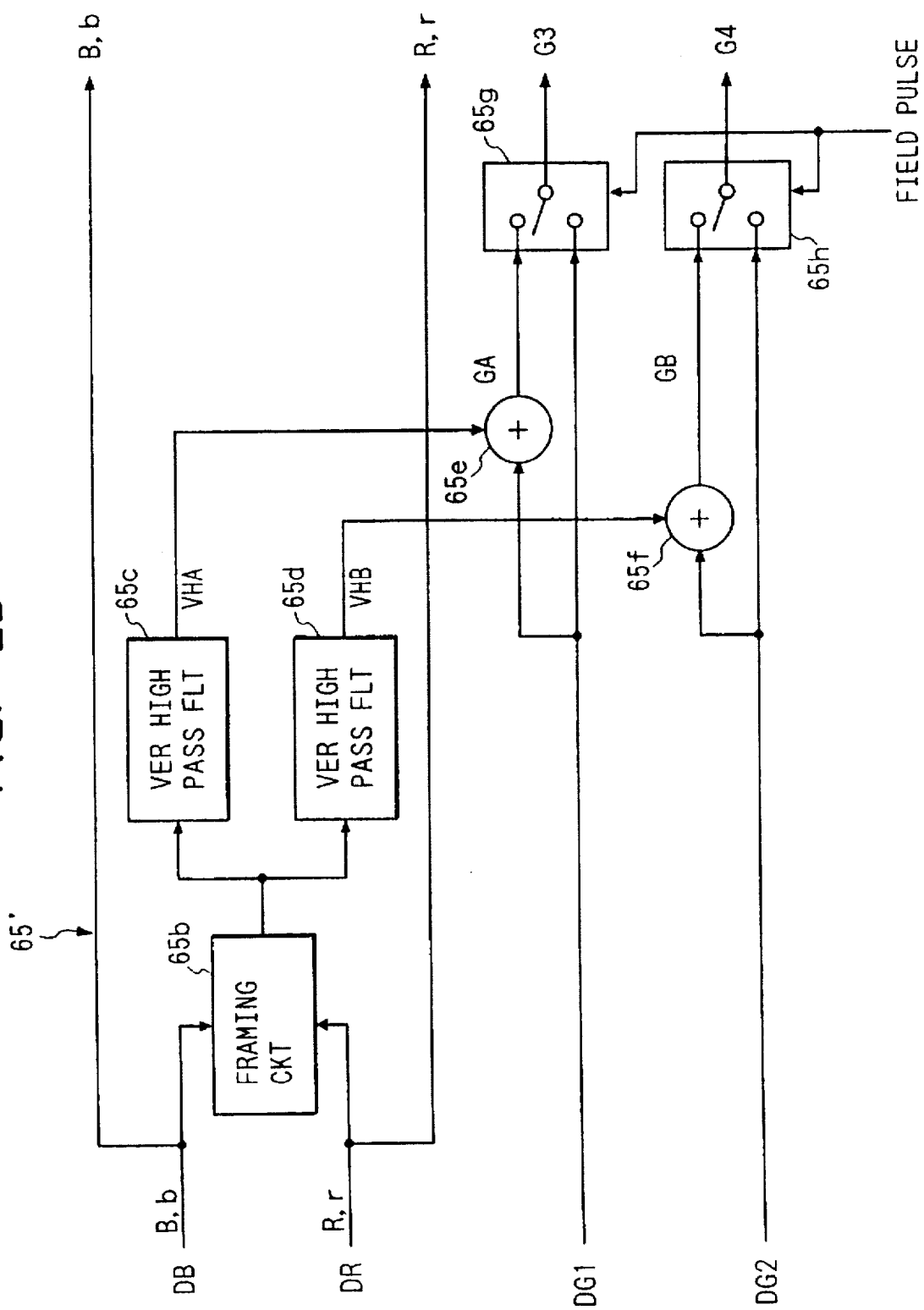
FIG. 25 is a block diagram of the third embodiment showing the signal processing circuit.

FIG. 25 is a block diagram of the third embodiment showing the signal processing circuit 65'. In FIG. 25, the blue color signal B and b are outputted as they are and supplied to a framing circuit 65b. Similarly, the red color signal R and r are outputted as they are and supplied to the framing circuit 65b. The framing circuit 65b supplies a framed color signal to a vertical high pass filter 65c and the framed color signal to a vertical high pass filter 65d. The vertical high pass filter 65c supplies a vertical high frequency component VHA to an adder 65e. The vertical high pass filter 65d supplies a vertical high frequency component VHB to an adder 65f. The adder 65e adds the vertical high frequency component VHA to the green color signals from the image sensor DG1 and supplies the result to a switch 65g responsive to the field pulse. The adder 65f adds the vertical high frequency component VHB to the green color signals from the image sensor DG2 and supplies the result to a switch 65h responsive to the field pulse. The switch 65g outputs either of outputs of the adder 65e or the green color signals G1 and g1 in response to the filed pulse as the signal G3 of one of outputs of the signal processor 65'. The switch 65h outputs either of outputs of the adder 65f or the green color signals G2 and g2 in response to the field pulse as the signal G4 of one of outputs of the signal processor 65'.

Figure 26:
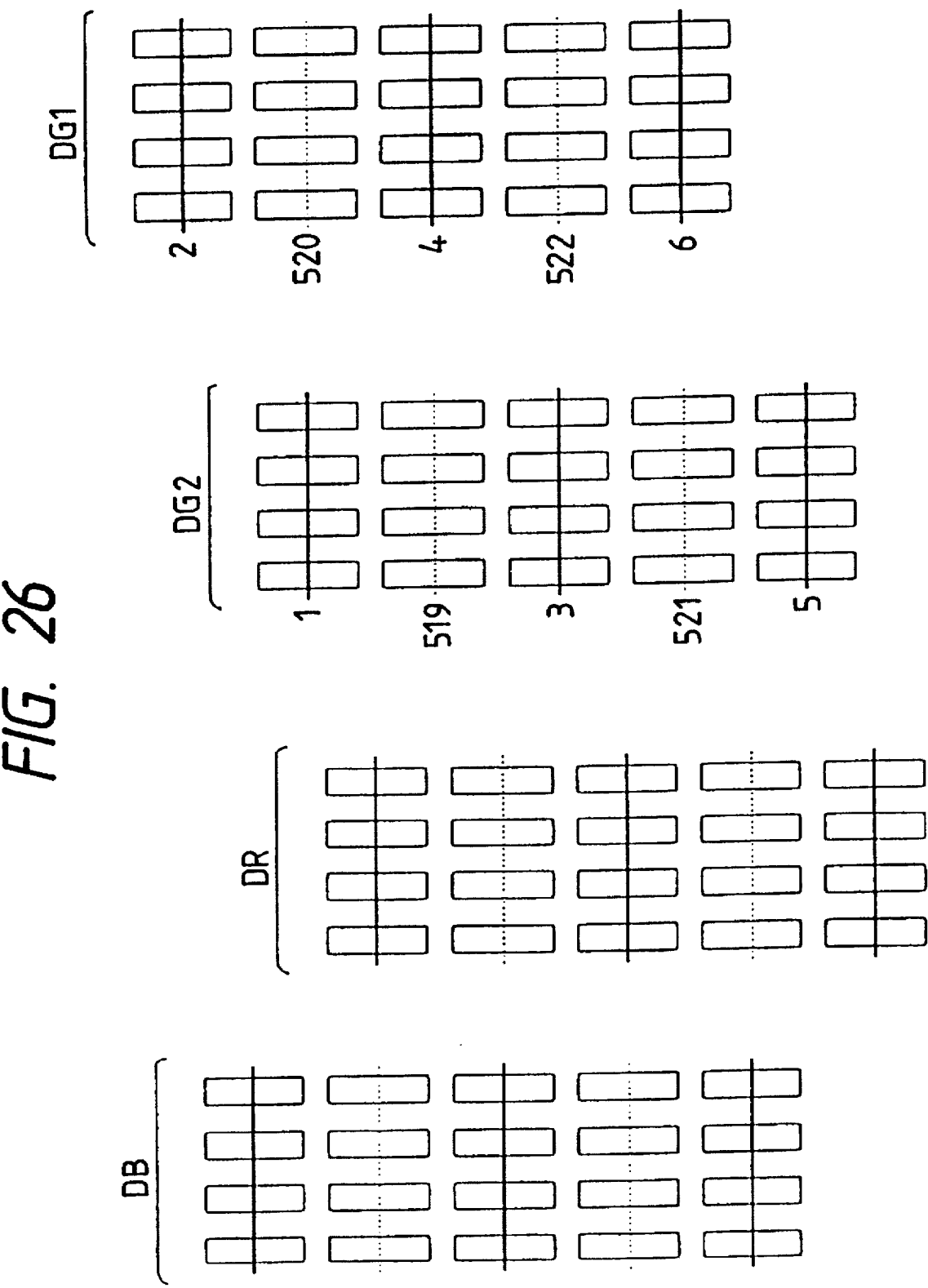
FIG. 26 is an illustration of the third embodiment showing an order of reading charge signals of the respective image sensors shown in FIG. 22.

Operation of the third embodiment will be described. FIG. 26 is an illustration of the third embodiment showing an order of reading charge signals of the respective image sensors shown in FIG. 22. In FIG. 26, numerals denotes the order of the scanning lines of image sensors DG1 and DG2 of the Hi-Vision screen. In FIG. 26, the sensors DB and DR are arranged with vertical shift by one vertical pixel pitch. Therefore, the image sponsors DB and DR are read by one line by one line alternately.

On the other hand, the image sensors DG1 and DG2 are read by the reading control circuit 50 in the manner as shown in FIG. 8 which is the same as the first embodiment. Thus, a first field is formed by reading charge signals of the pixels on lines denoted by the solid lines and a second field is formed by reading charge signals of the pixels on lines denoted by the chain lines.

An operation of the signal processing circuit 65' will be described. FIG. 27 is an illustration of the third embodiment showing a map of pixels numbered. In FIG. 27, capital letters G, B, and R denote pixels read in an odd field and small letters g, b, and r denote pixels read in an even field and "G" and "g" denote green signals and "R" and "r" denote red signals and "1" and "2" denote pixels read from the image sensors DG1 and DG2 respectively.

All image sensors DB, Dr, DG1, and DG2 are driven at the same instance. Therefore, pixels denoted the same value of (m, n) are read at the same instance. For example, pixels G1 m, n, G2 m, n, R m, n, and B m, n are read at the same time during an even field and pixels g1 m, n, g2 m, n, r m, n, and b m, n are read at the same time during an odd field.

It should be noted that at any position of pixels of R, r, B, and b, there is a combination of pixels R and b or r and B. That is, there is always a combination of pixels to be read during even and odd fields. This is because the image sensor DB is vertically shifted by one vertical pixel pitch from the image sensor DR and this is shown in FIG. 24 wherein a pair of the painted triangles (even) and non-painted triangles (odd) are located at the same position.

This positional relation allows to provide a framing processing by simply adding the color signals from the image sensors DB and DR without a field memory. The framing circuit 65' effects this framing processing.

Assuming that pixels are denoted as shown in FIG. 27, the vertical high pass filters 65c and 65d effects operations represented by Eqs. (7) and (8) at an odd field and produce vertical high frequency components VHA and VHB.

$$VHA_{m,n} = \frac{2B_{m,n} - (R_{m,n-1} + R_{m,n})}{4} \quad (7)$$

$$VHB_{m,n} = \frac{2R_{m,n} - (B_{m,n} + B_{m,n+1})}{4} \quad (8)$$

Simply describing, this is an operation of subtracting a signal of a pixel vertically adjacent to the target pixel from a signal of the target pixel. That is, this corresponds an operation determining a change in the vertical direction. As described above, the vertical high frequency component can be obtained from the color signals of the same field. Therefore, the false vertical high frequency component developed due to the vertical high frequency component obtained between the color signals of different fields is suppressed.

Then, the adders 65e and 65f effects operations represented by Eqs. (9) and (10).

$$GA_{m,n} = G1_{m,n} + \frac{VHA_{m,n} + VHA_{m+1,n}}{2} \quad (9)$$

$$BG_{m,n} = G2_{m,n} + VHB_{m,n} \quad (10)$$

That is, the vertical high frequency component from the color signals B and R is added to the green signal G, so that broadband green signals GA and GB are generated. This operations are similar to Eqs. (3) and (4) used in the first embodiment. As mentioned, the signal processing circuit 65' of this embodiment provides the framed signal and vertical high frequency component without a field memory with the false vertical frequency component suppressed.

The switches 65g and 65h are switched in response to the field pulse. That is, they output output signals from the adders 65e and 65f at the odd field and outputs color signals G1, g1, G2, and g2 at the even field. Therefore, the vertical high frequency component added signals GA and GB are used at an odd field which corresponds the first field of the Hi-Vision screen and green signals G1 and g2 from the image sensor DG1 and DG2 are used at an even field which corresponds the second field of the Hi-Vision screen.

Then, a general operation will be described. The image sensors DG1, DG2, DB, and DR are driven at the same time by drive signals from the reading control circuit 50 and signals of even and odd fields are outputted alternately. These signals are amplified by the preamplifiers 52 to 57 and a/d converted by the a/d converters 58 to 63 to supply digital signals to the signal processing circuit 65'. The signal processing circuit 65' effects operations represented by Eqs. (7) to (10) to supply the vertical high frequency component added signals GA and GB. The switches 65g and 65h supply signals GA and GB and green signals g1 and g2 are alternately every field to output signals G3 and G4 together with the blue signals B and b and red signals R and r.

As mentioned, in this embodiment, two image sensors are provided for green color and the image sensor for red color is vertical shifted by a half of the vertical pixel pitch from these image sensors for green color and the image sensor for blue color is vertical shifted by one vertical pixel pitch from the image sensor DR for red color. The resolution of the image of green color is increased in the vertical direction by extracting the vertical high frequency components from the outputs signals of the blue and red image sensors DB and DR and adding the extracted vertical high frequency component to the video signal of the green color, so that a green color video signal for the Hi-Vision is provided. Therefore, it is possible to ⅓ inch image sensors for the PAL system can be used for the Hi-Vision imaging apparatus. This makes the cost of the imaging apparatus low. The single plate structure is used for the blue and red colors. This is advantageous for miniaturization, lightening, reducing a cost of the imaging apparatus. The resolution of blue and red color is not increased in this embodiment. However, the resolutions of the blue and red colors can be increased by using the green signal having a higher resolution through compensation and interpolation. The image sensors employ ⅓ inch image sensors for the PAL system, so that the reading speed of the charge signals and the processing speed of the charge signal are lower than those for the Hi-Vision. Therefore, it is possible to use currently available circuit devices having a low processing speed. Moreover, a currently available DSP (digital signal processor) can be used before the reading data from the line memories 70, 72, 74, 75, 76, and 77, so that a total cost of the imaging apparatus can be reduced. Moreover, the image sensors DB and DR are vertically shifted by one vertical pixel pitch. Therefore, the vertical high frequency component can be obtained from the signal at the same field, so that a field memory is not used. Therefore, the cost of the imaging apparatus of this embodiment is reduced. Further, the development of the false vertical component can be suppressed.

What is claimed is:

1. An imaging apparatus for outputting blue, red, and green color signals in response to an image ray, comprising:

a color separation optical system for separating said image ray into blue, green, and red image rays;

a first image sensor, having first pixels vertically and horizontally arranged, for receiving said blue image ray and producing said blue color signal;

a second image sensor, having second pixels vertically and horizontally arranged, for receiving said red image ray and producing said red color signal;

a third image sensor, having third pixels vertically and horizontally arranged, for receiving said green image ray and producing said green color signal;

wherein at least one of said first and second pixels comprise offset pixels having vertical relative offsets against said third pixels to have a relative interlace relation with said third pixels to produce a screen to be produced from said blue, red, and green color signals, said screen having a higher resolution than said first to third image sensors;

a vertical component extracting circuit for extracting a vertical high frequency component from the blue color signal, if the first pixels comprise said offset pixels, and the red color signal, if the second pixels comprise said offset pixels, said vertical high frequency component corresponding to a green color luminance value at a corresponding position of the offset pixels;

an adding circuit for adding said vertical high frequency component to said green color signal to produce a second green color signal indicative of said green color luminance value;

a signal producing circuit for producing second blue and red color signals indicative of color luminance values at corresponding positions of said third pixels from said blue and red color signals;

first field generation means for outputting said blue and red color signals and said second green color signal to form a first field of said screen;

second field generation means for outputting said second blue and red color signals and said green color signal to form a second field of said screen; and reading control means for controlling the production of said blue, red, green and second green color signals in an interlace reading manner respectively;

wherein said first and second pixels respectively have second vertical relative offsets with respect to each other such that fields produced as a result of said interlace reading manner are different from each other.

2. An imaging apparatus as claimed in claim 1, wherein said vertical component extracting circuit further comprises a framing circuit for producing a framed color signal by adding said blue color signal to said red color signal and a vertical high pass filter for extracting said vertical high frequency component from an output of said framing circuit.

3. An imaging apparatus for outputting blue, red, and first and second green color signals in response to an image ray, comprising:

a first color separation optical system for separating said image ray into blue, red and green image rays;

a second separation optical system for separating said green image ray into first and second green image rays;

a first image sensor, having first pixels vertically and horizontally arranged, for receiving said blue image ray and producing the blue color signal;

a second image sensor, having second pixels vertically and horizontally arranged, for receiving said red image ray and producing the red color signal;

a third image sensor, having third pixels vertically and horizontally arranged, for receiving said first green image ray and producing the first green color signal;

a fourth image sensor, having fourth pixels vertically and horizontally arranged, for receiving said second green image ray and producing the second green color signal;

wherein at least one of said first and second pixels comprise vertical offset pixels having vertical relative offsets against said third pixels to have a first relative interlace relation with said third pixels to produce a screen to be produced from the blue, red, and first and second green color signals, said screen having a higher resolution than said first to fourth image sensors, said screen having a higher horizontal resolution than said first to fourth image sensors by arranging said third pixels having a horizontal relative offset against said fourth pixels to have a second relative interlace relation between said third and fourth pixels;

a vertical component extracting circuit for extracting a first vertical high frequency component from the blue color signal, if the first pixels comprise the vertical offset pixels, and the red color signal, if the second pixels comprise the vertical offset pixels, said first vertical high frequency component corresponding to a green color luminance value at a corresponding position of the vertical offset pixels;

a first adding circuit for adding said first vertical high frequency component to said first green color signal to produce a third green color signal indicative of a first green color luminance value;

an operation circuit for operating a second vertical high frequency component from said first vertical high frequency component of two horizontally consecutive pixels of said vertical offset pixels;

a second adding circuit for adding said second vertical high frequency component to said second green color signal to produce a fourth green color signal indicative of a second green color luminance value at an intermediate position of said two horizontally consecutive pixels of the vertical offset pixels;

first field generation means for outputting said blue and red color signals, and said third and fourth green color signals to form a first field of said screen; and second field generation means for outputting said blue and red color signals and said first and second green color signals to form a second field of said screen;

wherein said first and second pixels respectively have second vertical relative offsets with respect to each other such that said first and second fields are different from each other at any instance.

4. An imaging apparatus as claimed in claim 3, wherein said vertical component extracting circuit further comprises a framing circuit for producing a framed color signal by adding said blue color signal to said red color signal and a vertical high pass filter for extracting said vertical high frequency component from an output of said framing circuit.

5. An imaging apparatus for outputting a color video signal in response to an image ray, comprising:

a color separation optical system for separating said image ray into blue, green, and red image rays;

a first image sensor, having first pixels vertically and horizontally arranged, for receiving said blue image ray and producing a blue color signal;

a second image sensor, having second pixels vertically and horizontally arranged, for receiving said red image ray and producing a red color signal;

a third image sensor, having third pixels vertically and horizontally arranged, for receiving said green image ray and producing a first green color signal;

wherein at least one of said first and second pixels comprise offset pixels having vertical relative offsets against said third pixels to have a relative interlace relation with said third pixels to produce a screen to be produced from said video signal, said screen having a higher resolution than said first to third image sensors;

a vertical component extracting circuit for extracting a vertical high frequency component from the blue color signal, if the first pixels comprise said offset pixels, and the red color signal, if said second pixels comprise said offset pixels, said vertical high frequency component corresponding to a green color luminance value at a corresponding position of the offset pixels;

an adding circuit for adding said vertical high frequency component to said first green color signal to produce a second green color signal indicative of said green color luminance value;

an outputting circuit for outputting said color video signal using said blue color signal, red color signal, and first and second green color signals such that said screen is formed; and reading control means for controlling the production of said blue, red, and first and second green color signals in an interlace reading manner respectively;

wherein said first and second pixels respectively have second vertical relative offsets with respect to each other such that fields produced as a result of said interlace reading manner are different from each other at an instance.

6. An imaging apparatus as claimed in claim 5, wherein said vertical component extracting circuit further comprises a framing circuit for producing a framed color signal by adding said blue color signal to said red color signal and a vertical high pass filter for extracting said vertical high frequency component from an output of said framing circuit.

7. An imaging apparatus for outputting a color video signal in response to an image ray, comprising:

a first color separation optical system for separating said image ray into blue, red and green image rays;

a second color separation optical system for separating said green image ray into first and second green image rays;

a first image sensor, having first pixels vertically and horizontally arranged, for receiving said blue image ray and producing a blue color signal;

a second image sensor, having second pixels vertically and horizontally arranged, for receiving said red image ray and producing a red color signal;

a third image sensor, having third pixels vertically and horizontally arranged, for receiving said first green image ray and producing a first green color signal;

a fourth image sensor, having fourth pixels vertically and horizontally arranged, for receiving said second green image ray and producing a second green color signal;

wherein at least one of said first and second pixels comprise vertical offset pixels having vertical relative offsets against said third pixels to have a first relative interlace relation with said third pixels to produce a screen to be produced from said video signal, said screen having a higher resolution than said first to fourth image sensors, said screen having a higher horizontal resolution than said first to fourth image sensors by arranging said fourth pixels having a horizontal relative offset against said third pixels to have a second relative interlace relation between said third and fourth pixels;

a vertical component extracting circuit for extracting a first vertical high frequency component from the blue color signal, if the first pixels comprise said vertical offset pixels, and the red color signal if said second pixels comprise said vertical offset pixels, said first vertical high frequency component corresponding to a green color luminance value at a corresponding position of the vertical offset pixels;

a first adding circuit for adding said first vertical high frequency component to said first green color signal to produce a third green color signal indicative of a first green color luminance value;

an operation circuit for operating a second vertical high frequency component from said first vertical high frequency component of two horizontally consecutive pixels of said vertical offset pixels;

a second adding circuit for adding said second vertical high frequency component to said second green color signal to produce a fourth green color signal indicative of a second green color luminance value at an intermediate position of said two horizontally consecutive pixels of the vertical offset pixels;

an outputting circuit for outputting said color video signal using said blue color signal, red color signal, and first, second, third, and fourth green color signals such that said screen is formed; and reading control means for controlling the production of said blue, red, and first, second, third and fourth green color signals in an interlace reading manner respectively;

wherein said first and second pixels respectively have second vertical relative offsets with respect to each other such that fields produced as a result of said interlace reading manner are different from each other at any instance.

8. An imaging apparatus as claim in claim 7, wherein said vertical component extracting circuit further comprises a framing circuit for producing a framed color signal by adding said blue signal to said red color signal and vertical high pass filter for extracting said vertical high frequency component from an output of said framing circuit.

* * * * *